US008323528B1

(12) United States Patent
Jia et al.

(10) Patent No.: US 8,323,528 B1
(45) Date of Patent: Dec. 4, 2012

(54) PHOSPHORESCENT COMPOSITIONS, METHODS OF MAKING THE COMPOSITIONS, AND METHODS OF USING THE COMPOSITIONS

(75) Inventors: Weiyi Jia, Chelmsford, MA (US); Xiaojun Wang, Stateboro, GA (US); William Yen, Athens, GA (US); Laurel C. Yen, legal representative, Athens, GA (US); George D. Jia, Lock Haven, PA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 623 days.

(21) Appl. No.: 12/080,268

(22) Filed: Apr. 2, 2008

Related U.S. Application Data

(60) Provisional application No. 60/921,319, filed on Apr. 2, 2007, provisional application No. 61/027,121, filed on Feb. 8, 2008.

(51) Int. Cl.
*C09K 11/80* (2006.01)
*C09K 11/79* (2006.01)
*C09K 11/78* (2006.01)
(52) U.S. Cl. .......................... 252/301.4 R; 252/301.4 F
(58) Field of Classification Search ............ 252/301.4 R
See application file for complete search history.

(56) References Cited

U.S. PATENT DOCUMENTS 6,455,986 B2    9/2002   Chai et al.

OTHER PUBLICATIONS

Voda et al, "Fano antiresonances in the optical-absorption spectra of Cr3+-doped La3Ga5.5Nb0.5O14 and La3Ga5.5Ta0.5O14 crystals", Phys. Rev. B, vol. 49, No. 6, Feb. 1, 1994, pp. 3755-3759.*
Casalboni et al, "Optical spectroscopy of La3Ga5SiO14:Cr3+ crystals",Phys. Rev. B, vol. 49, No. 6, Feb. 1, 1994, pp. 3781-3790.*
Azkargorta et al, "Cr3+—>Nd3+ Energy Transfer and Nd3+ Laser Action Studies of La3Ga5SiO14:Cr3+:Nd3+ Co-doped Crystal", IEEE Journ. Quantum Electronic, vol. 33, No. 3, Mar. 1997, pp. 474-482.*
Yamaga et al, "Substitutional disorder and the ground state spectrocopy of gallogermanate crystals", J. Phys.:Condens. Matter, 9, 1997, pp. 5679-6578.*
The International Search Report and Written Opinion dated Nov. 26, 2009.
Shui T. Lai, et al. "Room Temperature Near-Infrared Tunable Cr: La3Ga5SiO14 Laser," IEEE Journal of Quantum Electronics, vol. 24, No. 9, Sep. 1988, pp. 1922-1926.
Grinberg, Marek, "Spectroscopic Characterisation of Disordered Materials Doped with Chromium," Optical Materials, 19, 2002, pp. 37-45.
Molchanov V.N., et al. "Crystal Structure and Optical Activity of La3Nb0.5Ga5.5O14 and Sr3Ga2Ge4oi4 Single Crystals of the Langasite Family," JETP Letters, vol. 74, No. 4, 2001, pp. 222-225.

* cited by examiner

*Primary Examiner* — Carol M Koslow
(74) *Attorney, Agent, or Firm* — Thomas Horstemeyer, LLP

(57) ABSTRACT

Compositions, methods of making compositions, materials including compositions, crayons including compositions, paint including compositions, ink including compositions, waxes including compositions, polymers including compositions, vesicles including the compositions, methods of making each, and the like are disclosed.

92 Claims, 12 Drawing Sheets
(12 of 12 Drawing Sheet(s) Filed in Color)

PHOSPHORESCENT COMPOSITIONS, METHODS OF MAKING THE COMPOSITIONS, AND METHODS OF USING THE COMPOSITIONS

CROSS-REFERENCE TO RELATED APPLICATION

This application claims priority to co-pending U.S. provisional application entitled "Phosphorescent Compositions and Methods" having Ser. No. 60/921,319 filed on Apr. 2, 2007, and to U.S. provisional application entitled "$Cr^{3+}$ Doped Lanthanum-Gallate Phosphors with Persistent Phosphorescence for Infrared Sensing" having Ser. No. 61/027,121 filed Feb. 8, 2008, each of which are entirely incorporated herein by reference.

STATEMENT REGARDING FEDERALLY SPONSORED RESEARCH OR DEVELOPMENT

The U.S. government may have a paid-up license in this disclosure and the right in limited circumstances to require the patent owner to license to others on reasonable terms as provided for by the terms of Prime Contract No. DE-AC05-00OR22725 awarded by the United States Department of Energy.

BACKGROUND

Persistent phosphorescence was discovered in the 11$^{th}$ century in China and Japan and in the 16$^{th}$ century in Europe (Shionoya, S. (1998) in *Phosphor Handbook*, Shionoya, S; and Yen, W. M; (eds.), CRC Press, Inc., Boca Raton, New York, p. 3). The phenomenon involves two kinds of active centers, emitters and traps. Emitters are centers capable of emitting radiation after excitation of the center. Traps do not emit radiation, but store excitation energy and release it gradually to the emitter. Emitter centers can be created through the addition of activators, i.e., small amounts of intentionally added impurity atoms or ions, to the host matrix. Co-activators are additional, intentionally-added impurity ions which may affect (improve or modify) the emission of an activator. For example, a co-activator can be added to form trapping centers that can increase the persistence time of the phosphor.

Persistence of phosphorescence is measured herein as persistence time, which is the time, after discontinuing irradiation, that it takes for phosphorescence of a sample to decrease to the threshold of eye sensitivity. This threshold is the signal level of emission intensity that an unaided eye can perceive in the dark. Persistence times are assessed by following phosphorescence intensity as a function of time. Measurement comparisons of persistence times must be performed under identical conditions using the same detection systems.

Persistent phosphors are a luminescent material to show bright afterglow, in dark after charged by UV light. Various persistent phosphors in the visible have been developed. These include (a) sulfides, such as ZnS:Cu (green), ZnS:Cu,Co (green) and ZnS:Mn,Cu (green), CaS:Bi (460 nm, blue) and CaS:Eu,Tm (450 nm, red) developed before the sixties; (b) aluminates, such as $CaAl_2O_4:Eu^{2+},Nd^{3+}$ (F. C. Palilla, A. K. Levine and M. R. Tomkus, Fluorescent Properties of alkaline earth aluminate of the type $M_2Al_2O_4$ activated by divalent europium, J. Electrochem. Soc. 115 (6) (1968) 642-644), $SrAl_4O_7:Eu^{2+},Pr^{3+}/Dy^{3+}$ (W. M. Yen, W. Jia, L. Lu, H. Yuan, U.S. Pat. No. 6,117,362; 2000), $SrAl_2O_4:Eu^{2+},Dy^{3+}$ (W. M. Yen, W. Jia, L. Lu and H. Yuan, U.S. Pat. No. 6,267,911 B1, 2001; H. Lange, U.S. Pat. No. 3,294,699, 12/1996, Murayama et al. U.S. Pat. No. 5,424,006; T. Matsuzawa, Y. Aoki, N. Takeuchi and Y. Murayama, A new long persistent phosphor with high brightness $SrAl_2O_4:Eu^{2+},Dy^{3+}$, J. Electrochem. Soc. 143 (8) (1996) 2670-2673); those phosphors have emission in the violet (440 nm), green-blue (490 nm) and green (520 nm), respectively; and (c) silicates, such as $Sr_2MgSi_2O_7:Eu^{2+},Dy^{3+}$ with phosphorescence at 470 nm (Zhiguo Xiao and Zhiqiang Xiao, U.S. Pat. No. 6,093,346, 2000), $SrMgSi_2O_6:Eu^{2+},Nd^{3+}$ (470 nm, D. Jia, W. Jia, Y. Jia, to be published in J. Appl. Phys.), and $Ca_3MgSi_2O_8:Eu^{2+},Dy^{3+}$ with afterglow band at 475 nm (Yuanhua Lin, Zhongtai Zhang, Zilong Tang, Xiaoxin Wang, Junying Zhang, Zhishan Zheng, J. Eur. Ceram. Soc. 21 (2001) 683). From the above list, it can be seen that all the emission of the persistent phosphors developed up to now are in the visible. The longest wavelength is in red near 650 nm ($CaS:Eu^{2+},Tm^{3+}$). These visible persistent phosphors have been widely used for security signs, indicators of control panels, and so on.

In the recent technical development, persistent phosphors in infrared or near infrared have gained attention because of military and security applications. Unfortunately, up to now, no such persistent phosphors are available in market.

It has been reported that some lanthanum gallates showed strong emission in the infrared and the single crystals were used for tunable infrared lasers. For example, $La_3Ga_5SiO_{14}:Cr^{3+}$ [A. A. Kaminskii, A. P. Shkadarevich, B. V. Mill, V. G. Koptev and A. A. Demidovich, Wide-band tunable stimulated emission from a $La_3Ga_5SiO_{14}:Cr$ crystal, Inorg. Mater. (USSR) 23 (1987) 618; S. T. Lai, B. H. T. Chai, M. Long and M. D. Shinn, Room temperature near-infrared tunable $Cr:La_3Ga_5SiO_{14}$ laser, IEEE J. Quantum Electron. Qe-23 (1987) 24]; $La_3Ga_5GeO_{14}$—Cr [A. A. Kaminskii, A. P. Shkadarevich, B. V. Mill, V. G. Koptev, A. V. Butashin, and A. A. Demidovich, Tunable stimulated emission of $Cr^{3+}$ ions and generation frequency self-multiplication effect in acentric crystals of La-gallogermanate structure, Inorg. Mater. (USSR), 24 (1988) 579]; $La_3Ga_{5.5}Nb_{0.5}O_{14}:Cr$ and $La_3Ga_{5.5}Ta_{0.5}O_{14}:Cr$ [A. A. Kaminskii, A. P. Shkadarevich, B. V. Mill, V. G. Koptev, A. V. Butashin and A. A. Demidovich, Wide-band tunable stimulated emission of $Cr^{3+}$ ions in the trigonal crystal $La_3Ga_{5.5}Nb_{0.5}O_{14}$, Inorg. Mater. (USSR) 23 (1987) 1700]. However, no afterglow has been reported in the luminescent crystals.

In addition, the persistent time of infrared phosphors have to be redefined. Traditionally, the persistent time of visible phosphors is estimated based on perceivable luminous level of the afterglow by human eyes. For infrared persistence phosphors, such definition is no longer valid. The persistent time then should be determined by sensitivity of the detection systems and UV pump sources.

SUMMARY

Embodiments of the present disclosure include compositions, methods of making compositions, materials including compositions, crayons including compositions, paints including compositions, inks including compositions, waxes including compositions, polymers including compositions, vesicles including compositions, methods of making each, and the like.

Embodiments of the present disclosure include a composition, among others, that include: a phosphor that emits radiation when excited by incident radiation with a wavelength about 100 nm and 750 nm, wherein the phosphor has the following chemical formula: $M_3Ga_{5-x}A_x DO_{(m+(3y/2)+(tz/2))}:(yCr^{3+},zT'^+)$, wherein M is an ion selected from: $La^{3+}$, $Gd^{3+}$, $Lu^{3+}$, $Y^{3+}$, $Bi^{3+}$, $Ca^{2+}$, $Sr^{2+}$, $Sc^{3+}$, or combinations thereof; wherein A is an ion selected from: $Al^{3+}$, $Sc^{3+}$, $In^{3+}$, or combinations thereof, wherein $0 \leq x < 5$; wherein D is selected from $Si^{4+}$, $Ge^{4+}$, $Ti^{4+}$, $Zr^{4+}$, $Hf^{4+}$, $Ga_{0.5}Nb_{0.5}$, $Ga_{0.5}Ta_{0.5}$, $Ge_{1-x}Si_x$, $Ge_{1-x}Ti_x$, $Cr^{4+}$, $Cr^{6+}$ or combinations thereof, wherein x is from 0 to 1; wherein Nb and Ta have an oxidation state selected from: +3, +4, or +5; wherein D is selected from Nb or Ta, if one of the M of $M_3$ is $Ca^{2+}$, $Sr^{2+}$, or combinations thereof; wherein y is about 0.00001 to 0.075; wherein z is about 0 to 0.075; wherein T is selected from: (a) $Ce^{3+}$, $Pr^{3+}$, $Pm^{3+}$, $Nd^{3+}$, $Sm^{3+}$, $Eu^{3+}$, $Tb^{3+}$, $Dy^{3+}$, $Ho^{3+}$, $Er^{3+}$, $Tm^{3+}$, $Yb^{3+}$, $Lu^{3+}$, $Th^{4+}$ or combinations thereof; (b) $Mg^{2+}$, $Zn^{2+}$, $Pb^{2+}$, or combinations thereof; or (c) $Li^+$, $Na^+$, or combinations thereof; t is the charge of the cation T, which is a charge selected from: +1, +2, +3, or +4; and m is a number that, when multiplied by (−2) counter-balances the positive charge imparted by the $[M_3Ga_{5-x}A_xD]$ moiety.

Embodiments of the present disclosure include a composition, among others, that include: a phosphor that emits radiation, when excited by incident radiation with wavelength about 100 nm and 750 nm, wherein the phosphor has the following chemical formula: $M_3Ga_{5-x}A_x DO_{(m+(3y/2)+(3z'/2)+z''+z'''/2)}$: $(yCr^{3+}, z'T1^{3+}, z''T2^{2+}, z'''T3^+)$; wherein M is an ion selected from: $La^{3+}$, $Gd^{3+}$, $Lu^{3+}$, $Y^{3+}$, $Bi^{3+}$, $Ca^{2+}$, $Sr^{2+}$, $Sc^{3+}$ or combinations thereof; wherein A is an ion selected from: $Al^{3+}$, $Sc^{3+}$, $In^{3+}$ or combinations thereof, wherein $0 \leq x < 5$; wherein D is selected from $Si^{4+}$, $Ge^{4+}$, $Ti^{4+}$, $Zr^{4+}$, $Hf^{4+}$, $Ga_{0.5}Nb_{0.5}$, $Ga_{0.5}Ta_{0.5}$, $Cr^{4+}$, $Cr^{6+}$ or combinations thereof; wherein Nb and Ta have an oxidation state selected from: +3, +4, or +5; wherein D is selected from Nb or Ta, if one of the M of $M_3$ is $Ca^{2+}$, $Sr^{2+}$, or combinations thereof; wherein y is about 0.00001 to 0.075; wherein each of z', z'', and z''' are independently about 0 to 0.075; wherein each of T1, T2, and T3 are independently selected from: (a) $Ce^{3+}$, $Pr^{3+}$, $Pm^{3+}$, $Nd^{3+}$, $Sm^{3+}$, $Eu^{3+}$, $Tb^{3+}$, $Dy^{3+}$, $Ho^{3+}$, $Er^{3+}$, $Tm^{3+}$, $Yb^{3+}$, $Lu^{3+}$, $Th^{4+}$ or combinations thereof; (b) $Mg^{2+}$, $Zn^{2+}$, $Pb^{2+}$, or combinations thereof; or (c) $Li^+$, $Na^+$, or combinations thereof; and wherein m is a number that, when multiplied by (−2) counter-balances the positive charge imparted by the $[M_3Ga_{5-x}A_xD]$ moiety.

Embodiments of the present disclosure include a composition, among others, that include: a phosphor that emits radiation, when excited by incident radiation with wavelength about 100 nm and 750 nm, wherein the phosphor has the following chemical formula: $M_3Ga_{5-x}A_x DO_{(m+(3y/2)+(3z'/2)+z''+z'''/2)}$: $(yCr^{3+}, z'T1^{3+}, z''T2^{2+}, z'''T3^+)$; wherein M is an ion selected from: $La^{3+}$, $Gd^{3+}$, $Lu^{3+}$, $Y^{3+}$, $Bi^{3+}$, $Ca^{2+}$, $Sr^{2+}$, $Sc^{3+}$ or combinations thereof; wherein A is an ion selected from: $Al^{3+}$, $Sc^{3+}$, $In^{3+}$ or combinations thereof, wherein $0 \leq x < 5$; wherein D is selected from $Si^{4+}$, $Ge^{4+}$, $Ti^{4+}$, $Zr^{4+}$, $Hf^{4+}$, $Ga_{0.5}Nb_{0.5}$, $Ga_{0.5}Ta_{0.5}$, $Cr^{4+}$, $Cr^{6+}$ or combinations thereof; wherein Nb and Ta have an oxidation state selected from: +3, +4, or +5; wherein D is selected from Nb or Ta, if one of the M of $M_3$ is $Ca^{2+}$, $Sr^{2+}$, or combinations thereof; wherein y is about 0.00001 to 0.075; wherein each of z', z'', and z''' are independently about 0 to 0.075; wherein each of T1, T2, and T3 are independently selected from: (a) $Ce^{3+}$, $Pr^{3+}$, $Pm^{3+}$, $Nd^{3+}$, $Sm^{3+}$, $Eu^{3+}$, $Tb^{3+}$, $Dy^{3+}$, $Ho^{3+}$, $Er^{3+}$, $Tm^{3+}$, $Yb^{3+}$, $Lu^{3+}$, $Th^{4+}$ or combinations thereof; (b) $Mg^{2+}$, $Zn^{2+}$, $Pb^{2+}$, or combinations thereof; or (c) $Li^+$, $Na^+$, or combinations thereof; and wherein m is a number that, when multiplied by (−2) counter-balances the positive charge imparted by the $[M_3Ga_{5-x}A_xD]$ moiety.

The notation ": $(yCr^{3+}, zT)$" or its alternative form ":$yCr^{3+},zT$" used herein indicate that $Cr^{3+}$ and T appear as dopants in the overall formula, with their respective doping levels represented by y and z, as defined above.

It is to be understood by those skilled in the art that the compounds referred to throughout this disclosure are mixed oxides. As such, the overall metal to oxygen stoichiometric ratio, given by $[(9+yCr^{3+}+2z+z'+2z'')/(m+(3y/2)+(3z/2)+z'+z''/2)]$, wherein 9 is the sum of the stoichiometric indexes of the metal ions M, Ga, A and D, is not an absolute number but rather represents a point in an oxide phase, in which phase partial reduction of M, Ga, A, and D may occur, leading to small structural defects and an apparent deviation from that stoiciometric ratio. It is further understood that deviations of up to about 10% of that ratio are included within embodiments of the present disclosure, leading to an apparent deficiency (or excess) of oxygen atoms and that the formula will still represent embodiments of the disclosure.

For simplicity, the shorter, $M_3Ga_{5-x}A_xDO_o$: $(yCr^{3+},zT^{t+})$ formula, wherein subscript o represents the stoichiometric index for oxygen atoms, will be used herein, which will be apparent to one skilled in the art. The value of subscript o used herein may not account, in some cases and also for simplicity, for the oxygen atoms that counterbalance the charges of $Cr^{3+}$ and $T^{t+}$ dopants.

Embodiments of the present disclosure also include compositions, wherein the radiation wavelength has an emission band peak at about 750 to 1450 nm. Embodiments of the present disclosure further include compositions, wherein the radiation wavelength has an emission band peak at about 945 to 1070 nm.

Embodiments of the present disclosure further include a method of making compositions, among others, that include: using a method selected from: solid state reaction method with or without using flux selected from $B_2O_3$, $H_3BO_3$, $Li_2CO_3$, $LiHCO_3$, $Li_2O$, $Bi_2O_3$, $Na_2CO_3$, or PbO; sol-gel method; combustion method; precipitation method, and combinations thereof.

Embodiments of the present disclosure include a material comprising compositions, wherein the composition is in one of the following forms: powders, nanopowders, ceramics, single crystals, and combinations thereof, and methods of making each.

Embodiments of the present disclosure also include articles that include the composition, where the articles can be crayons, paints, waxes, inks, and polymers. In addition, embodiments include methods of making each of these articles.

Embodiments of the present disclosure also include polymer-based vesicles, encapsulating the composition described herein.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

The patent or application file contains at least one drawing executed in color. Copies of this patent or patent application publication with color drawing(s) will be provided by the Office upon request and payment of the necessary fee.

FIG. 1 (b) illustrates a graph showing the complete emission band measured with Triax 320 equipped with an InGaAs detector; and FIG. 1 (c) illustrates a graph showing the decay curves of the afterglow of the phosphors under different sintering temperature.

FIG. 2 (b) illustrates a graph showing the complete emission band measured with Triax 320 equipped with an InGaAs detector.

FIG. 3 (b) illustrates a graph showing the complete emission band measured with Triax 320 equipped with an InGaAs detector; and FIG. 3 (c) illustrates a graph showing the decay curves of afterglow of the phosphors sintered at different temperatures.

FIG. 4 (b) illustrates a graph showing the complete emission band measured with Triax 320 equipped with an InGaAs detector.

FIG. 6 (b) illustrates a graph showing the complete emission band measured with Triax 320 equipped with an InGaAs detector.

FIG. 7 (b) illustrates a graph showing the complete emission band measured with Triax 320 equipped with an InGaAs detector.

FIG. 8 (b) illustrates a graph showing the complete emission band measured with Triax 320 equipped with an InGaAs detector.

FIG. 9 (b) illustrates a graph showing the complete emission band measured with Triax 320 equipped with an InGaAs detector.

DETAILED DESCRIPTION

Figure 1A:
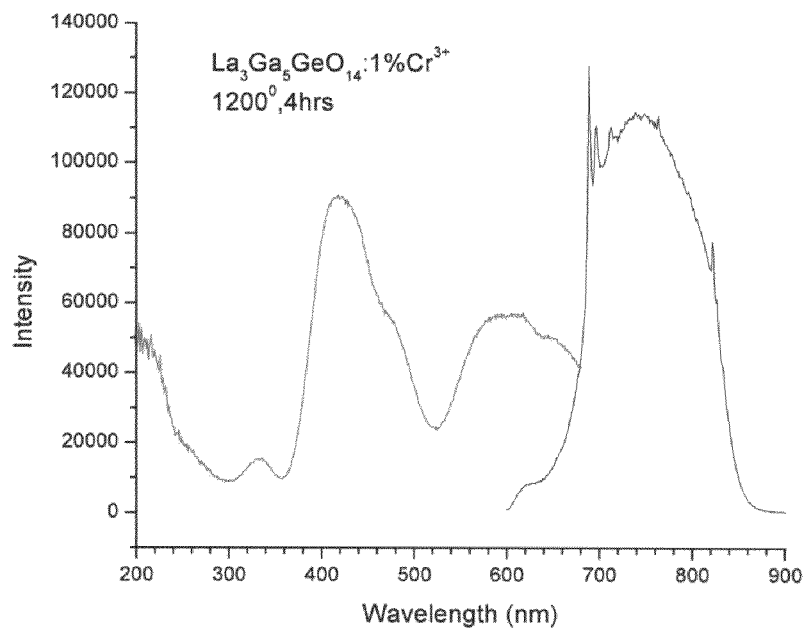
FIG. 1 (a) illustrates a graph showing the excitation and emission spectra (by FluoroMax2) of $La_3Ga_5GeO_{14}$:$yCr^{3+}$, where y corresponds to ca. 1 mol % doping with $Cr^{3+}$ relative to the overall composition.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

It is to be understood by those skilled in the art that the compounds referred to throughout this disclosure are mixed oxides. As such, the overall metal to oxygen stoichiometric ratio, given by $[(9+yCr^{3+}+2z'+z''+2z''')/(m+(3y/2)+(3z'/2)+z''+z'''/2)]$, wherein 9 is the sum of the stoichiometric indexes of the metal ions M, Ga, A and D, is not an absolute number but rather represents a point in an oxide phase, in which phase partial reduction of M, Ga, A and D may occur, leading to small structural defects and an apparent deviation from that stoiciometric ratio. It is further understood that deviations of up to 10% of that ratio are possible, leading to an apparent deficiency (or excess) of oxygen atoms and that the formula will still represent embodiments of the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, inorganic chemistry, physics, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

It must also be noted that the use of % to describe the levels of ion doping the compositions herein refers to molar percentage.

Discussion

Embodiments of the disclosure provide compositions containing phosphors (e.g., persistent phosphors), methods of making the composition, articles including the composition, methods of using the composition, and the like. In particular, the compositions include the lanthanum gallate phosphors with persistent infrared phosphorescence (afterglow) as long as about 24 hours. The wavelength of emission band peak can be about 750 to 1450 nm or about 945 to 1070 nm. In this spectral range, Si, Ge, and InGaAs semiconductor detectors are quite sensitive. The intensity of the afterglows and persistent time were increased by co-doping proper trapping ions.

Embodiments of the disclosure, described herein may be used, without limitation, as invisible markers for security applications, or as passive heating elements, when films comprising these embodiments are applied onto surfaces that are exposed to direct or reflected lighting (e.g., sunlight or artificial lighting), causing these films to emit infra-red even longer after exposure to exciting radiation has ceased.

As used herein, "persistent phosphor" includes materials having persistence time based upon the composition of the persistent phosphor, the detection systems, and the light source (UV pumping source). It is generally the case that phosphors having longer persistence times are more preferred. A persistent phosphor may have an emission spectrum such that its wavelength is about 750 to 1450 nm.

In the present disclosure, $Cr^{3+}$ doped Lanthanum gallate phosphors with persistent phosphorescence in the infrared from about 750 nm to 1450 nm are introduced. An embodiment of the general chemical formula can be expressed as: $M_3Ga_{5-x}A_xDO_{(m+(3y/2)+(tz/2))}$: $(yCr^{3+},zT)$, where M can be $La^{3+}$, $Gd^{3+}$, $Lu^{3+}$, $Y^{3+}$, $Bi^{3+}$, $Ca^{2+}$, $Sr^{2+}$, $Sc^{3+}$ or their combinations; A can be $Al^{3+}$, $Sc^{3+}$ or $In^{3+}$, or their combinations, $0 \leq x < 5$; D can be $Si^{4+}$, $Ge^{4+}$, $Ti^{4+}$, $Zr^{4+}$, $Hf^{4+}$, a complex ((e.g., $Ga_{0.5}Nb_{0.5}$) or (e.g., $Ga_{0.5}Ta_{0.5}$)), $Ge_{1-x}Si_x$, $Ge_{1-x}Ti_x$, $Cr^{4+}$, $Cr^{6+}$ or combinations thereof, in which Nb and Ta may be present in the oxidation states +3, +4, +5; D can be also Nb or Ta if one of the M of $M_3$ is $Ca^{2+}$, $Sr^{2+}$, or combinations thereof. $Cr^{3+}$ is used as infrared emitter wherein y is about 0.00001 to 0.075; T can be: (a) rare earth ions such as $Ce^{3+}$, $Pr^{3+}$, $Pm^{3+}$, $Nd^{3+}$, $Sm^{3+}$, $Eu^{3+}$, $Tb^{3+}$, $Dy^{3+}$, $Ho^{3+}$, $Er^{3+}$, $Tm^{3+}$, $Yb^{3+}$, $Lu^{3+}$, $Th^{4+}$, or combinations thereof, (b) divalent ions such as $Mg^{2+}$, $Zn^{2+}$, $Pb^{2+}$ or combinations thereof, or (c) monovalent ions such as $Li^+$, $Na^+$, or combinations thereof, t is the charge of the cation T, which can be +1, +2, +3, or +4, and m is a number that, when multiplied by (−2) counter-balances the positive charge imparted by the $[M_3Ga_{5-x}A_xD]$ moiety; and z can be about 0 to 0.075. Ions for T are used to create traps.

In an embodiment of the present disclosure, the chemical formula can be represented as $M_3Ga_{5-x}A_xDO_{(m+(3y/2)+(3z'/2)+z''+z'''/2)}$:$(yCr^{3+}, z'T1^{3+}, z''T2^{2+}, z'''T3^+)$; where M is an ion selected from: $La^{3+}$, $Gd^{3+}$, $Lu^{3+}$, $Y^{3+}$, $Bi^{3+}$, $Ca^{2+}$, $Sr^{2+}$, $Sc^{3+}$, or combinations thereof; where A is an ion selected from: $Al^{3+}$, $Sc^{3+}$, $In^{3+}$, or combinations thereof, where $0 \leq x < 5$; where D is selected from $Si^{4+}$, $Ge^{4+}$, $Ti^{4+}$, $Zr^{4+}$, $Hf^{4+}$, $Ga_{0.5}Nb_{0.5}$, $Ga_{0.5}Ta_{0.5}$, $Ge_{1-x}Si_x$, $Ge_{1-x}Ti_x$, $Cr^{4+}$, $Cr^{6+}$, or combinations thereof; where Nb and Ta may be present in the oxidation states +3, +4, or +5; where D is selected from Nb or Ta, if one of the M of $M_3$ is $Ca^{2+}$, $Sr^{2+}$, or combinations thereof; where y can be about 0.00001 to 0.075; where each of z', z'', and z''' can be independently about 0 to 0.075; where each of T1, T2, and T3 are independently selected from: (a) $Ce^{3+}$, $Pr^{3+}$, $Pm^{3+}$, $Nd^{3+}$, $Sm^{3+}$, $Eu^{3+}$, $Tb^{3+}$, $Dy^{3+}$, $Ho^{3+}$, $Er^{3+}$, $Tm^{3+}$, $Yb^{3+}$, $Lu^{3+}$, $Th^{4+}$, or combinations thereof; (b) $Mg^{2+}$, $Zn^{2+}$, $Pb^+$, or combinations thereof; or (c) $Li^+$, $Na^+$, or combinations thereof; and where m is a number that, when multiplied by (−2) counter-balances the positive charge imparted by the $[M_3Ga_{5-x}A_xD]$ moiety. In an another embodiment, where z''=z'''=0, this formula is reduced to the original $M_3Ga_{5-x}A_xDO_{(m+(3y/2)+(tz/2))}$: $(yCr^{3+}, zT^{t+})$, where T=C is a trivalent cation.

In an embodiment, z''=z'''=0, z'>0, and T is a trivalent cation. In another embodiment, z'=z''=0, z'''>0, and T is a monovalent cation. In another embodiment, z'=z'''=0, z''>0, and T is a divalent cation. In another embodiment, one of z', z'', or z''' is 0.

Embodiments of the compositions can be synthesized using methods such as, but not limited to, solid-state reaction methods, sol-gel methods, combustion methods, and precipitation methods. Embodiments of the compositions can be fabricated to form ceramics, powders, and nanoparticles, for example. Embodiments of the compositions can be used for infrared sensing. In addition, embodiments of the present disclosure include the disclosed compositions in combination with a matrix, a resin, an ink, a fluid, a wax, a paint, a vehicle, a carrier, or combinations thereof, wherein the emission persists from about 1 second to 26 hours after excitation to form an article. Embodiments of the present disclosure include compositions wherein the emission persists from about 4 hours to 24 hours after excitation.

In addition, embodiments of the composition can be applied to the surfaces of various types of structures, mixed into plastics, rubber, polyvinyl chloride, other synthetic resins, glass, and the like.

Embodiments of the compositions can be synthesized by causing the oxides of the individual metals in that composition to react with each other in a mixture and sintering the mixture of oxides.

In another embodiment a flux material is optionally added to the mixture prior to sintering.

In an embodiment, the flux material can be selected from: $B_2O_3$, $H_3BO_3$, $Li_2CO_3$, $Na_2CO_3$, $Bi_2O_3$, PbO, or combinations thereof.

In another embodiment, the mixture of oxides can be combusted directly by a flame, such as, for instance, acetylene: air flame.

Embodiments of the compositions can be synthesized by co-precipitating the individual oxides as a mixture from solution and sintering the precipitate.

In an embodiment, the composition can be described by the formula: $La_3Ga_5GeO_{14}:yCr^{3+},zT$, where y can be about 0.00001 to 0.075, and z can be about 0 to 0.075, T can be chosen from rare earth ions ($Ce^{3+}$, $Pr^{3+}$, $Nd^{3+}$, $Sm^{3+}$, $Eu^{3+}$, $Tb^{3+}$, $Dy^{3+}$, $Ho^{3+}$, $Er^{3+}$, $Tm^{3+}$, $Yb^{3+}$ and their combinations), divalent ions ($Mg^{2+}$, $Zn^{2+}$, $Pb^{2+}$) or monovalent ions ($Li^+$, $Na^+$, or their combination), or their combinations. The phosphor shows a broad emission band peaking near about 1030 nm.

The raw materials are mixed, ground to fine powders, presintered at about 950° C. in air for a few hours, then ground to fine powders again, and pressed into pellets, for example. Finally the samples were sintered at about 1200 to 1400° C. for four hours in air. The phosphors demonstrate afterglow with emission band near about 1030 nm if excited with UV radiation, for example, about 254 nm to 300 nm.

In another embodiment, the composition can be described by the formula: $La_3Ga_4(Ge_{1-x}Si_x)O_{14}:yCr^{3+},zT$. Ge is partially or fully replaced by Si and y and z are defined above. When x is about 1, the composition has chemical formulae as $La_3Ga_4SiO_{14}:yCr^{3+},zT$. The composition is sintered below about 1250° C. to avoid melting.

In another embodiment, the composition can be described by the formula: $La_3Ga_4(Ge_{1-x}Ti_x)O_{14}:yCr^{3+},zT$. Ge is partially or fully replaced by Ti and y and z are defined above. When x is about 1, the composition has chemical formulae as $La_3Ga_4TiO_{14}:yCr^{3+},zT$. The synthesis procedure is similar to that mentioned directly above. The phosphor showed emission band peaking near about 1070 nm.

In another embodiment, the composition can be described by the formula: $La_3Ga_5(Ga_{0.5}Nb_{0.5})O_{14}:yCr^{3+},zT$. In this composition, Ge is replaced by a complex group of $Ga_{0.5}Nb_{0.5}$, and y and z are defined above. The synthesis procedures are similar as to that mentioned directly above.

In another embodiment, the composition can be described by the formula: $La_3Ga_5(Ga_{0.5}Ta_{0.5})O_{14}:yCr^{3+},zT$. In this composition, Ge is replaced by a complex group of $Ga_{0.5}Ta_{0.5}$, and y and z are defined above. The synthesis procedures is similar to that mentioned directly above.

In another embodiment, the composition can be described by the formula: $La_2CaGa_5NbO_{14}:yCr^{3+},zT$. In this composition, Nb replaces Ge, while one of $La_3$ is replaced by Ca, and y and z are defined above. The sintering temperature should be below about 1300° C. to avoid melting. The synthesis procedure is similar to that mentioned directly above.

In another embodiment, the composition can be described by the formula: $La_2CaGa_5TaO_{14}:yCr^{3+},zT$. In this composition, Ta replaces Ge, while one of $La_3$ is replaced by Ca, and y and z are defined above. The synthesis procedure is similar to that mentioned directly above.

In another embodiment, the composition can be described by the formula: $La_2SrGa_5NbO_{14}:yCr^{3+},zT$. In this composition, Nb replaces Ge, while one of $La_3$ is replaced by Sr, and y and z are defined above. The synthesis procedure is similar to that mentioned directly above.

In another embodiment, the composition is described by the formula: $La_2SrGa_5TaO_{14}:yCr^{3+},zT$. In this composition, Ta replaces Ge, while one of $La_3$ is replaced by Sr, and y and z are defined above. The synthesis procedure is similar to that mentioned directly above.

In another embodiment, the composition is described by the change: La in the above compositions can be partially or fully replaced by $Y^{3+}$, $Gd^{3+}$, $Lu^{3+}$, $Bi^{3+}$, or combinations thereof. For example, $Lu_3Ga_5GeO_{14}:yCr^{3+},zT$.

In another embodiment, the composition is described by the change: Ga in the above compositions can be partially substituted by $Al^{3+}$, $Sc^{3+}$, $In^{3+}$, or combinations thereof.

In another embodiment, the composition can be described by the change: wherein y can be about 0.001 to 0.02.

In another embodiment, the composition can be described by the change: T can be selected from: $Dy^{3+}$, $Eu^{3+}$, $Nd^{3+}$, $Tm^{3+}$, or combinations thereof, and y can be about 0.001 to 0.02.

In another embodiment, the composition can be described by the change: T can be selected from: $Pb^{2+}$, $Mg^{2+}$, or $Zn^{2+}$, and y can be about 0.001 to 0.02.

In another embodiment, the composition is described by the change: Ti can be selected from: $Pb^{2+}$, $Mg^{2+}$, $Zn^{2+}$, or combinations thereof, and y can be about 0.001 to 0.02.

In another embodiment, the composition can be described by the change: T can be selected from $Li^+$, $Na^+$, or combinations thereof, and y can be about 0.001 to 0.02.

In another embodiment, T can be a combination of a first cation and a second cation, wherein the first cation can be selected from $Nd^{3+}$, $Eu^{3+}$, or $Dy^{3+}$, and the second cation can be selected from $Pb^{2+}$, $Zn^{2+}$, $Li^+$, or $Na^+$, and y is about 0.001 to 0.02.

In another embodiment, the composition can be described by the change: T can be selected from: $Dy^{3+}$, $Eu^{3+}$, $Nd^{3+}$, $Tm^{3+}$, or combinations thereof.

In another embodiment, the composition is described by the change: T can be selected from: $Pb^{2+}$, $Mg^{2+}$, or $Zn^{2+}$.

In another embodiment, the composition can be described by the change: T can be selected from: $Pb^{2+}$, $Mg^{2+}$, $Zn^{2+}$, or combinations thereof.

In another embodiment, the composition can be described by the change: T can be selected from $Li^+$, $Na^+$, or combinations thereof.

In another embodiment, T can be a combination of a first cation and a second cation, wherein the first cation can be selected from $Nd^{3+}$, $Eu^{3+}$, or $Dy^{3+}$, and the second cation can be selected from $Pb^{2+}$, $Zn^{2+}$, $Li^+$, or $Na^+$.

It should be noted that traps can be produced by co-doping with trivalent rare earth ions, such as $Dy^{3+}$, $Eu^{3+}$, $Nd^{3+}$, or other rare earth ions.

All the compositions mentioned above show certain afterglow after irradiated by deep UV light. Doping the trivalent rare earth ions can add more traps and enhance the afterglow and persistent time.

Embodiments of the present disclosure also include traps produced by divalent ions, such as, but not limited to, $Zn^{2+}$, $Pb^{2+}$, and $Mg^{2+}$. The divalent ions doped in the phosphors can produce oxygen vacancies, which may serve as traps for the photo-excited electrons. However, in an embodiment large amounts of divalent ions in the phosphors (large amount of oxygen vacancies) may quench luminescence and afterglow. This may be true for $Mg^{2+}$. In some embodiments, the doping level could be controlled in the range of about 0.001 to 0.01 or less per molecule.

Embodiments of the present disclosure also include traps produced by monovalent ions, such as $Li^+$ or $Na^+$. These ions will produce oxygen vacancies (and traps) in the phosphors. Then the afterglow and persistent time can be increased.

Embodiment of the present disclosure provide for compositions where the emission persists from about 1 second to 26 hours after excitation.

Embodiment of the present disclosure provide for compositions where the emission persists from about 4 hours to 24 hours after excitation.

Embodiment of the present disclosure provide for compositions where the emission persists from about 1 second to 26 hours after excitation.

Embodiment of the present disclosure provide for compositions where the emission persists from about 4 hours to 24 hours after excitation.

Embodiment of the present disclosure provide for compositions where the emission persists from about 1 second to 26 hours after excitation.

Embodiment of the present disclosure provide for compositions where the emission persists from about 4 hours to 24 hours after excitation.

Embodiment of the present disclosure provide for compositions where the emission persists from about 1 second to 26 hours after excitation.

Embodiment of the present disclosure provide for compositions where the emission persists from about 4 hours to 24 hours after excitation.

Embodiment of the present disclosure provide for compositions where the emission persists from about 1 second to 26 hours after excitation.

Embodiment of the present disclosure provide for compositions where the emission persists from about 4 hours to 24 hours after excitation.

Embodiment of the present disclosure provide for compositions where the emission persists from about 1 second to 26 hours after excitation.

Embodiment of the present disclosure provide for compositions where the emission persists from about 4 hours to 24 hours after excitation.

Embodiment of the present disclosure provide for compositions where the emission persists from about 1 second to 26 hours after excitation.

Embodiment of the present disclosure provide for compositions where the emission persists from about 4 hours to 24 hours after excitation.

Embodiments of the present disclosure also include traps created by combinations of one or more of combinations above.

The formulation of the composition depends, in part, on the end result desired, the emission characteristics, how and what the composition is used as or in, and the like. The components in the composition can be adjusted to accomplish the desired results. Exemplary formulations are provided in the Examples.

Phosphor Combinations

Embodiments of the present disclosure include materials (e.g., enamels, waxes, varnishes, paints, and polymers) that include phosphors as described herein. The disclosed phosphor compositions can be combined with additional materials such as a carrier or vehicle to produce, for example, a composite, laminate, mixed material, blended material, suspension, colloid, fluid, spray, gel, wax, crystal, film, or mist that retains the phosphorescent properties of the particular phosphor composition used. Exemplary materials that could be combined with the disclosed phosphors include, but are not limited to a matrix, resin, powder, or fluid.

The additional material to be combined with the disclosed phosphor compositions is typically translucent and does not significantly absorb energy needed to excite the phosphor or absorb energy emitted from the phosphor. For example, material containing pigments combined with the phosphor can be selected so that the pigments do not absorb the excitation energy needed to excite the phosphor, or do not absorb the energy emitted by the phosphor. Combinations of phosphors with pigments of a color other than that emitted by the phosphor can be used to produce a third color different from both the phosphor emission and the pigment.

Additionally, the material can be selected to minimize a decrease in efficiency of the emitter due to thermal effects, i.e., during the process of conversion of UV radiation into visible radiation. Some of the incident energy can be transferred to the matrix by vibrations of the phosphor that coincide in energy with vibrations of the matrix. Molecular (matrix) and reticular (phosphor) vibrations occur in the infra-red portion of the spectrum. This region is characterized by the heat radiation, associated with atomic and molecular motions. This system crossover is rather common and should be considered for all blends.

In some embodiments, the materials combined with the disclosed phosphor compositions typically do not detrimentally react with the phosphor, for example causing degradation of the phosphor or phosphor properties. Suitable non-reactive materials include, but are not limited to, polymers, organic solvents, paint, resin, ink, coloring agents, natural or synthetic polymers such as nylons, urethanes, acrylics, carbohydrates, proteins, aliphatic hydrocarbons, lipids, wax, fatty acids, plastics, thermoplastics, elastomers, thermoelastomers, polypropylene, polyethylene, branched aliphatic hydrocarbons, fluoropolymers, silicones, and/or polysiloxanes.

Composition Applications

As mentioned above, the composition including the phosphor can be included in a matrix, a resin, a fluid, a wax, a paint, a vehicle, a carrier, or a combination thereof, to form an article. As such, the composition can be included in many applications as described previously. For example, the composition can be used in an article. The article can include writing implements (e.g., crayons), paints, resins, polymer (e.g., thermosetting polymers and thermoplastic polymers), and the like. The composition can be mixed with other components, with the resultant mixture having the characteristics of the composition.

Writing Implements

Generally, the phosphor is incorporated into writing implements that can apply the composition to a surface, for example a crayon or other writing implement. One embodiment of the present disclosure provides crayons composed of a clear synthetic resin (matrix) and one or more of the disclosed compositions dispersed therein. The compositions are generally in the form of powders insoluble in a dispersion medium. The proportion of the composition in the crayon can be modified according to the kind of composition and other factors but is usually about 0.1-30 weight %, preferably 1-20 weight %.

The disclosed writing implements can also contain a gelling agent. The gelling agent can be those used in conventional gel crayons. For example, at least one of dibenzylidenesorbitol and tribenzylidenesorbitol series compounds can be used. Thus, at least one member selected from the group consisting of dibenzylidenesorbitol, tribenzylidenesorbitol, and their derivatives can be employed.

The dibenzylidenesorbitol derivatives mentioned above include, but are not limited to, compounds available upon substitution of the benzene nucleus of each benzylidene group of dibenzylidenesorbitol with a $C_{1-3}$ alkyl group in an optional position, thus including such species as [di(p-methylbenzylidene)]sorbitol, [di(m-ethylbenzylidene)]sorbitol, and [di(p-chlorobenzyl idene)]sorbitol, among others. The above-mentioned tribenzylidenesorbitol derivatives include but are not limited to compounds available upon substitution of the benzene nucleus of each benzylidene group of tribenzylidenesorbitol with a $C_{1-3}$ alkyl group in an optional position, thus including such species as [tri(p-methyl benzylidene)]sorbitol, [tri(m-ethylbenzyl idene)]sorbitol, and [tri(p-chlorobenzylidene)]sorbitol, among others.

The amount of the gelling agent in the crayon can be judiciously selected according to the kind of gelling agent, but may be usually about 2-12 weight % and preferably 3-8 weight %. If the gelling agent is used in an excessive proportion, the gel will become too hard so that the coloring power of the crayon may deteriorate. If the proportion of the gelling agent is too small, gelation will not occur easily.

In some embodiments, an organic solvent can be used so long as it does not interfere with the properties of the composition, and known organic solvents can be used. Among such known solvents, monohydric alcohols, glycols, glycol ethers, and their esters are used with advantage in the present disclosure. The monohydric alcohol includes, but is not limited to, ethanol, methanol, and isopropyl alcohol. The glycol includes, but is not limited to, ethylene glycol, propylene glycol, diethylene glycol, dipropylene glycol, and hexylene glycol. The glycol ether includes, but is not limited to, glycol methyl ethers, glycol ethyl ethers, glycol propyl ethers, and glycol butyl ethers.

The proportion of the organic solvent in embodiments of the disclosed crayon can be selected in relation to the composition and other components, but may be usually about 20-80 weight %, preferably 30-65 weight %. If the organic solvent is excessive, gelation may not occur. On the other hand, if the amount of the organic solvent is too small, the other components will not be sufficiently dissolved so that no homogeneous gel may be obtained.

The resin component is not particularly restricted in kind but the various resins that are used in the gel crayon or the like can be employed. One or more resins can be used, including but not limited to, a film-forming resin and an adhesion-improving resin, alone or in combination.

The film-forming resin is not particularly restricted in kind, so long as it is capable of enhancing the hardness of the phosphorescent crayon and forming a tough film on the substrate surface. Thus, for example, cellulosic resins such as cellulose acetate butyrate, ethylcellulose, acetylcellulose, etc. and vinyl resins such as polyvinyl butyral, polyvinyl acetate, vinyl acetate-vinyl chloride copolymer resin, vinyl acetate-ethylene copolymer resin, etc. can be used. Those resins can be used each independently or in a combination of two or more species. Among the above-mentioned resins, polyvinyl butyral resins with an acetyl content of 5% or less, a hydroxyl content of 18-27%, a butyral content of 69% or more and a degree of polymerization in the range of 300-2000 are particularly suitable.

The adhesion-improving resin is not particularly restricted in kind, either, only provided that it is capable of improving adhesion to the substrate surface. Thus, for example, ketone resin, xylene resin, and amide resin can be used. The ketone resin can, for example, be the product of condensation between cyclohexanone and formaldehyde. The xylene resin may for example be the product of condensation between m-xylene and formalin. The amide resin may for example be a thermoplastic resin available upon polycondensation of a dimer acid and a di- or polyamine and having a molecular weight of about 4000 to 9000. Those adhesion improving resins can also be used each independently or in a combination of two or more species.

The proportion of the resin component in the crayon should vary with different kinds of resins but may be generally about 3-40 weight % and preferably 6-35 weight %. If the resin component is excessive, the gel will become too hard so that the coloring power of the crayon may deteriorate. If the amount is too small, gelation will be difficult to occur.

The formulating amounts of said film-forming resin and adhesion-improving resin can also be selected in relation to the other components, but the recommended ratio of film-forming resin to adhesion-improving resin is about 1:0.1-5 by weight, preferably 1:0.2-3 by weight.

Embodiments of the disclosed crayon can include other known additives such as a colorant, filler, leveling agent, viscosity modifier, thixotropic agent, dryness imparting agent, etc. in suitable amounts where necessary. Moreover, a plasticizer such as diethyl phthalate, dibutyl phthalate, dioctyl phthalate, 2-ethylhexyl epoxyhexahydrophthalate, 2-ethylhexyl sebacate, tricresyl phosphate, etc. can also be incorporated in a suitable amount.

The gel strength of the crayon can be set according to the intended use for the end product, but is generally set at about 5-50 kg/cm$^2$ and preferably at 7-30 kg/cm$^2$. The gel strength can be modified by varying the kinds and formulating amounts of the organic solvent and/or gelling agent, for instance.

The method for production of one embodiment of the crayon comprises blending the above-mentioned components uniformly. A typical procedure comprises dissolving the film-forming resin etc. in an organic solvent, optionally dispersing a colorant thoroughly in the solution using a mill or the like, dissolving the organic solvent, adhesion-improving agent, and dispersing the composition therein, casting the final solution in a mould having a desired profile, and cooling the contents to solidify in situ. In carrying out the above procedure, heat may be applied for dissolving the respective components.

Phosphorescent Paints

Another embodiment of the present disclosure provides a paint composition including one or more of the disclosed compositions. The paint compositions can be water soluble or oil-based. Water soluble compositions can contain a water miscible or compatible resin, for example a polyurethane resin. The polyurethane resin (e.g., an acrylic urethane resin in either a semi-gloss or gloss) used in the composition can be a thermoplastic polymer derived or produced by the reaction of a polyisocyanate such as a diisocyanate (toluene diisocyanate) and a hydroxyl-containing material, for example, a polyol derived from propylene oxide or trichlorobutylene oxide, containing a water soluble group such as hydroxy, carboxylic acid or amine group. The amount of water miscible polyurethane resin (semi-gloss or gloss) used ranges from about 1% to about 80%, with a preferred range from about 3% to about 75%, more preferred from about 5% to about 70%, and a most preferred from about 10% to about 65% by volume of the paint composition.

The water-based dispersions employed in the present disclosure also can be used in commercially produced water based paints containing various colors used, for example, in painting highway roadway surfaces including white, yellow, orange, red, blue, and green. These types of paints may for example be used as a highway paint colored with the appropriate highway or roadway colors of such as white (titanium dioxide [ASTM D476, Type II] 100% purity), yellow (medium chrome yellow [ASTM D211, Type III] 100% purity), orange, and blue. The water based colored dispersion represents from about 30% to about 98%, typically a range being from about 40% to about 95%, more typically a range from about 50% to about 90%, and most typically a range being from about 55% to about 88% by volume of the water based paint composition.

The selection of the amount of composition, colored paint dispersion, and polyurethane resin from within the ranges discussed above, is effected, for example, by the color of the paint dispersion. Yellow paints require increased amounts of composition in comparison to white paints. The selected ranges permit a careful balance of the water-based compositions with other paint ingredients resulting, for example, in a highway paint composition with maximum desirable characteristics for all traffic conditions.

Optionally, a particulate may be used to impart abrasiveness to the paint composition and is either a natural abrasive material such as fine sand, silica, ground marble (white marble preferred), corundum (aluminum oxide, emery), pumice, iron oxide and feldspar. The more important synthetic types are silicon carbide, boron carbide, cerium oxide and fused alumina; or even some reflective substances (for example crushed reflective glass) as long as they will impart an effective abrasiveness to the surface of the dried paint. This abrasiveness reduces the likelihood of skidding by motor vehicles both in clear weather as well as when the surface of the road is wet. The operable range is an additive amount from about 1% to about 15% parts by volume, with a preferred range of about from 1% to about 13%, with from about 1% to about 9% being the most preferred.

Another embodiment provides a luminescent paint that contains a binder to adhere the particles of the compositions in the final product. The binder is selected to provide good adherence of the phosphor particles to each other and of the particles to the underlying substrate, with acceptable physical properties.

The binder includes, but is not limited to, a cross-linked and polymerized dimethyl silicone copolymer, which is flexible and resistant to degradation in ultraviolet (UV) light. This binder is disclosed in greater detail in U.S. Pat. No. 5,589,274, whose disclosure is incorporated by reference. The silicone polymer exhibits a good degree of deformability without cracking, both when pigment is present at moderate levels and when it is not present. This deformability permits the final solid paint to deform during the bending of the substrate when a thin substrate is used, or to permit the film to deform. The deformability of the binder also improves the resistance of the paint or film to cracking as a result of impacts and the like during service. Other flexible polymeric materials may be used for the matrix, such as silicone-modified epoxy, polyurethane, poly(dimethylsiloxane), poly(dimethylsiloxane-co-methylphenylsiloxane), and polyamide.

The binder is present in an operable amount. In a typical case, the binder is present in an amount such that the ratio, by weight, of the composition to the binder is from about 3:1 to about 5:1. If the ratio is less than about 3:1, the resulting paint tends to be transparent after drying. If the ratio is more than about 5:1, the critical phosphor volume concentration (CPVC) may be exceeded, the paint has insufficient mechanical strength, and the paint falls apart when dried.

The mixture of phosphor and binder is ordinarily a solid, and a paint vehicle may be added to form a solution or a slurry that may be applied using conventional painting techniques. An exemplary paint vehicle is naphthalene or xylene. The amount of the paint vehicle is selected to provide a consistency that permits application of the paint by the desired approach. For example, application by spraying requires the use of more of the paint vehicle than application by brush or roller.

The composition particles, binder, and paint vehicle are mixed together and milled together to form a liquid paint formulation in which the particles do not rapidly separate. There may be some separation over extended periods of time, but the paint is normally stirred or agitated just before or at the time of application.

Optionally, the phosphors and polymers herein may be mixed under conditions suitable for the formation of polymer-based vesicles, which will encapsulate the phosphors. Said conditions are, for instance, polymerization, under stirring and at liquid interfaces, wherein nano- to micrometer-sized particles of the phosphors are suspended in one of the phases, preferably the phase that does not contain the material being polymerized.

Resins

The disclosed compositions may be combined or dispersed in organic, inorganic, natural or synthetic resins. Suitable organic resins include but are not limited to polyoxyalkylene polymers such as polyoxyethylene, polyoxypropylene, polyoxybutylene, polyoxytetramethylene, polyoxyethylene/polyoxypropylene copolymer, and polyoxypropylene/polyoxybutylene copolymer; hydrocarbon polymers such as ethylene/propylene copolymer, polyisobutylene, isobutylene/isoprene copolymer, polychloroprene, polyisoprene, isoprene or butadiene/acrylonitrile and/or styrene copolymer, polybutadiene, isoprene or butadiene/acrylonitrile, and/or styrene copolymer, and hydrogenated polyolefin polymers obtained by hydrogenating these polyolefin polymers; polyester polymers obtained by the condensation of dibasic acids such as adipic acid with glycols or by the ring-opening polymerization of lactones; acrylate ester polymers such as polyacrylate esters obtained by the radical polymerization of monomers such as ethyl acrylate and butyl acrylate and acrylate ester copolymers of acrylate esters such as ethyl acrylate and butyl acrylate with vinyl acetate, acrylonitrile, methyl methacrylate or styrene; graft polymers obtained by the polymerization of a vinyl monomer in the above organic polymers; polysulfide polymers; polyamide polymers such as nylon 6 obtained by the ring-opening polymerization of $\epsilon$-caprolactam, nylon-6,6 obtained by the polycondensation of hexamethylenediamine with adipic acid, nylon-6,10 obtained by the polycondensation of hexamethylenediamine with sebacic acid, nylon-11 obtained by the polycondensation of $\epsilon$-aminoundecanoic acid, nylon-12 obtained by the ring-opening polymerization of $\epsilon$-aminolaurolactam, and nylon copolymers having two or more components selected from the above nylons; polycarbonate polymers obtained by, for example, the polycondensation of bisphenol A with carbonyl chloride; diallylphthalate polymers; and the like. Polymers having the above main chain structures include but are not limited to, polyester polymers, acrylate ester polymers, acrylate ester copolymers, polyoxyalkylene polymers, hydrocarbon polymers, polycarbonate polymers, and the like.

Additional resins useful in the disclosed compositions include epoxy resins. Suitable epoxy resins may be saturated or unsaturated or mixed, linear or branched or mixed, aliphatic, aliphatic with aromatic moieties, heterocyclic or mixed, and may bear other substituents, which do not materially interfere with the desired curing reaction. Examples of such substituents include, but are not limited to, halogens such as bromine and chlorine and substituted aliphatic or aromatic groups. Aliphatic epoxy resins are preferred for applications in highly ultraviolet (UV)-resistant topcoats, while polyglycidyl ethers of di- or polyhydric phenol type aromatic epoxy resins (infra) can be used preferably for other types of applications.

Additionally, the epoxy resin may be monomeric or polymeric (including polymers and oligomers in all forms from dimers and up). Depending primarily on their chemical compositions and molecular weights, the epoxy resins can be liquid, solid or mixtures under ambient conditions, particularly at room temperature (about 25° C.). Liquid epoxy resins under ambient conditions are more preferred for the curable epoxy composition of the present disclosure. If solid epoxy resins are used, it is preferred to dissolve them in a suitable solvent to make epoxy resin containing solutions for ambient condition applications. Epoxy resin suspensions or emulsions also may be used.

One group of suitable epoxy resins, including the glycidyl or polyglycidyl ethers, may be prepared by reacting epichlorohydrin with a compound containing at least one, preferably at least two or more, hydroxyl groups under basic conditions, such as in an alkaline reaction medium or in the presence of a suitable base. Examples of such suitable epoxy resins include, but are not limited to, polyglycidyl ethers of poly- or dihydric phenols, polyglycidyl ethers of glycols or polyglycols, epoxy novolacs, other glycidated polyphenolic resins, polyglycidyl esters of polycarboxylic acids, fusion reaction products between these epoxy resins and additional polyhydric phenolic compounds as those disclosed and described in U.S. Pat. Nos. 3,477,990 and 4,734,468, both of which are incorporated herein in their entirety, and mixtures thereof. Examples of suitable phenolic compounds used in preparing these epoxy resins include, but are not limited to resorcinol, catechol, t-butylcatechol, hydroquinone, bisphenol A (BPA), bisphenol E (BPE), bisphenol F (BPF), tris(4-hydroxyphenyl)methane, 1,1-bis(4-hydroxyphenyl)isobutane, 2,2-bis(4-hydroxyphenyl)butane, 2,2-bis(4-hydroxy-3-tert-butylphenyl)propane, 1,1-bis(4-hydroxyphenyl)cyclohexane, 2,6,2', 6'-tetrachloro-p, p'-bisphenol A, 2,6,2',6'-tetrabromo-p,p'-bisphenol A, 2,6,2',6'-tetramethyl-3,5,3'-tribromo-p-p'-biphenol, 2,6,2',6'-tetramethyl-3,5,3',5+-tetrabromo-p,p'-biphenol, tetramethylbiphenol, 1,5-dihydroxynaphthalene, bis(2-hydroxy-1-naphthyl)methane, bis(4-hydroxyphenyl) sulfone, bis(4-hydroxyphenyl)ether and the like and mixtures thereof. Some examples of commercially available epoxy resins of this group include, but are not limited to, EPON$^R$-Resins 825, 826, 828, 862 and 1000 from Shell Chemical Company. EPON$^R$ is a registered trademark of Shell Oil Company.

Another group of epoxy resins within the scope of the present disclosure is useful for elastomeric or semi-elastomeric secondary containment membrane applications due to the desired low viscosity, low modulus and high elongation properties of the cured product. This group includes, but is not limited to, polyglycidyl ethers of aliphatic or cycloaliphatic glycols or triols or polyols, or polyglycols. Examples of these glycols include, but are not limited to, 1,4-butanediol, 1,5-pentanediol, 1,6-hexanediol, neopentyl glycol, cyclohexanedimethanol, hydrogenated BPA, polyethylene glycol, polypropylene glycol, trimethylolethane, trimethylolpropane and mixtures thereof. Similar to the di- and polyhydric phenol is based epoxy resins, these aliphatic glycidyl and polyglycidyl ethers are usually prepared by reacting epichlorohydrin with a selected aliphatic diol (or triol or polyol or polyglycol or mixtures) in the presence of a Lewis acid catalyst, followed by conversion of the reaction intermediate(s) with sodium hydroxide to the product(s). Examples of commercially available epoxy resins in this group include, but are not limited to, HELOXY$^R$ Modifier 32 (a diglycidyl ether of a poly(propylene oxide) glycol), HELOXY$^R$ Modifier 68 (the diglycidyl ether of neopentyl glycol) and HELOXY$^R$ Modifier 107 (the diglycidyl ether of 1,4-cyclohexanedimethanol) from Shell Chemical Company. HELOXY$^R$ is a registered trademark of Shell Oil Company.

Suitable natural polymers include, but are not limited to, cellulose, starch, polysaccharides, wool, and silk.

Those of ordinary skill in the art will appreciate that the compositions of this disclosure can be prepared using starting materials other than those specifically disclosed herein and that procedures and techniques functionally equivalent to those described herein can be employed to make and assess the phosphors herein. Those of ordinary skill in the art will also appreciate that the host matrix of this disclosure may accommodate metal ions other than those specifically mentioned herein without significant effect upon composition properties.

Example 1

In the following embodiments, the procedures of synthesis are substantially the same except final sintering temperatures (which are specified as needed). All the raw materials are weighed, mixed, ground to fine mixed powders, and then pre-sintered at temperature at about 950° C. for 4 hours in air. The pre-sintered sample is ground to fine powder again. Finally, samples were sintered at elevated temperatures 1200-1500° C. in air. The excitation spectra and most of emission spectra were measured by a SPEX FluoroMax2, from which the instrumentation spectral correction is not available from about 850 nm to 900 nm. The emission spectra from about 650 to 1400 nm of some samples were measured with a SPEX Triax 320 equipped with an InGaAs detector. The instrumentation spectral response correction was also not available.

Embodiment 1

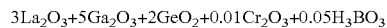

Figure 1B:
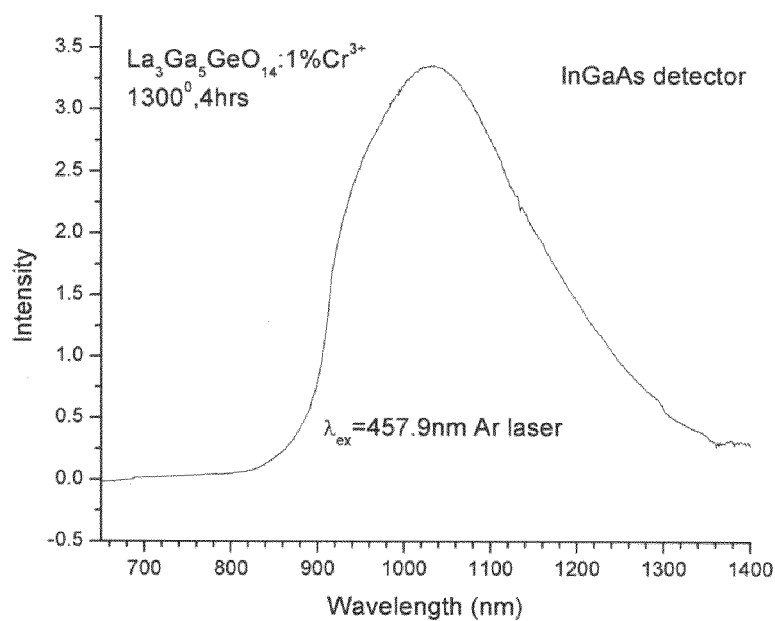
Figure 1C:
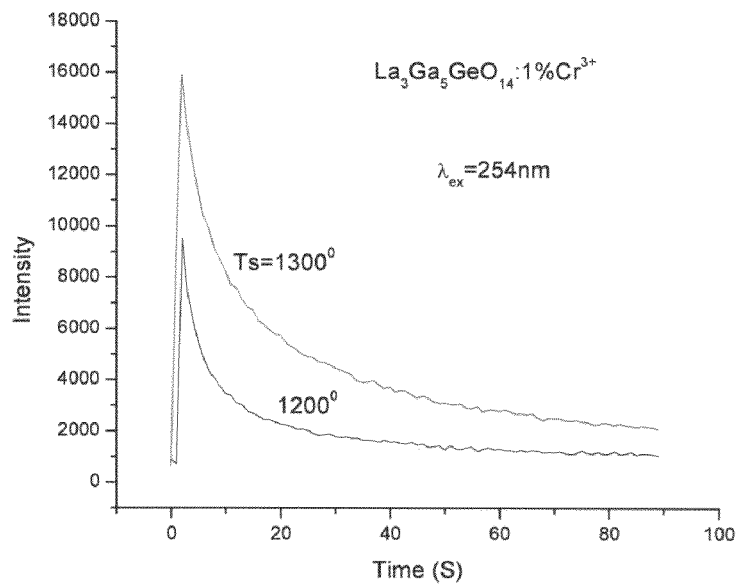

H$_3$BO$_3$ is used as a flux for better solid state chemical reaction. It can be replaced by B$_2$O$_3$. The mixture is pre-sintered at 950° C. in air for four hours. Finally, the samples are sintered at about 1300° C. in air for four hours. The excitation and emission spectra are shown in FIGS. 1 (a) and (b). FIG. 1(a) is actually the short wavelength wing of the entire emission band. Because of very low sensitivity of the PMT of FlowroMax2, after 850 nm the intensity drops rapidly. FIG. 1 (b) is the complete emission band measured on Triax 320 equipped with an InGaAs infrared detector. The emission peak is near 1030 nm. Because the lower sensitivity is at longer wavelength, the peak position should be little shifted to the shorter wavelength.

Embodiment 2

La$_3$Ga$_{5.5}$Nb$_{0.5}$O$_{14}$: 0.01Cr$^{3+}$

3La$_2$O$_3$+5.5Ga$_2$O$_3$+0.5Nb$_2$O$_5$+0.01Cr$_2$O$_3$+ 0.05H$_3$BO$_3$

Figure 2A:
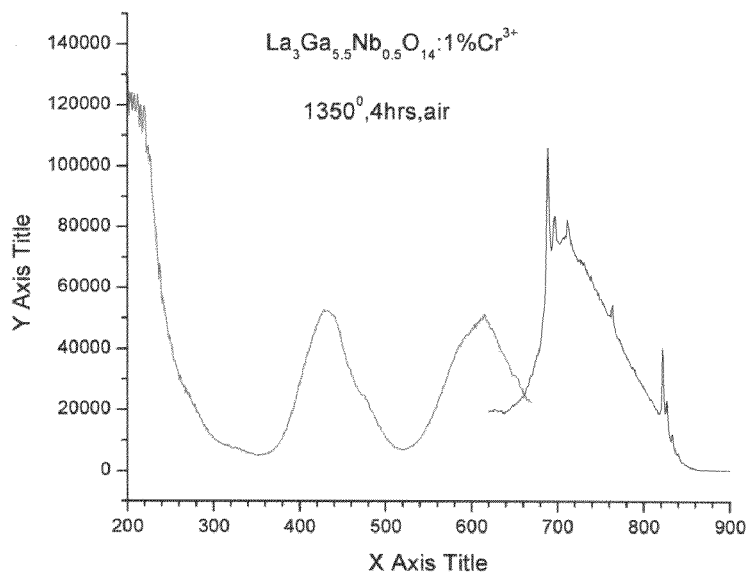
FIG. 2 (a) illustrates a graph showing the excitation and emission spectra (by FluoroMax2) of $La_3Ga_{5.5}Nb_{0.5}O_{14}$: $yCr^{3+}$, where y corresponds to ca. 1 mol % doping with $Cr^{3+}$ relative to the overall composition.
Figure 2B:
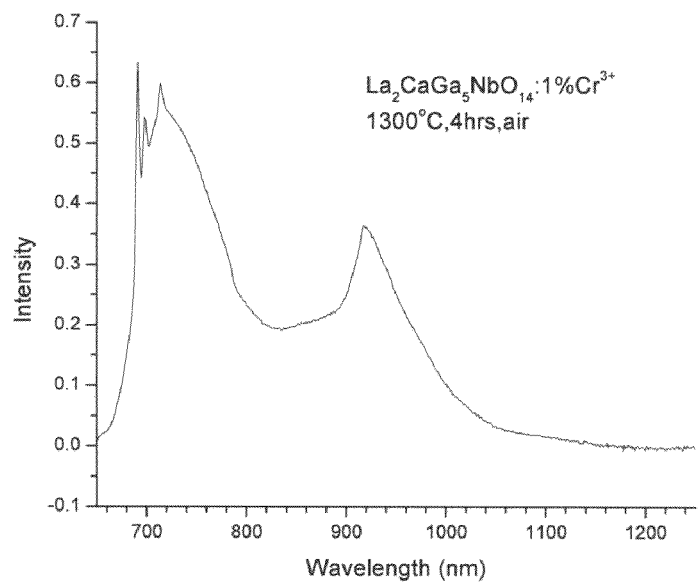

The synthesis conditions and procedures are similar as in Embodiment 1. The excitation and emission spectra are shown in FIGS. 2 (a) and (b).

Embodiment 3

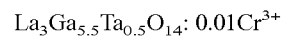

Figure 3A:
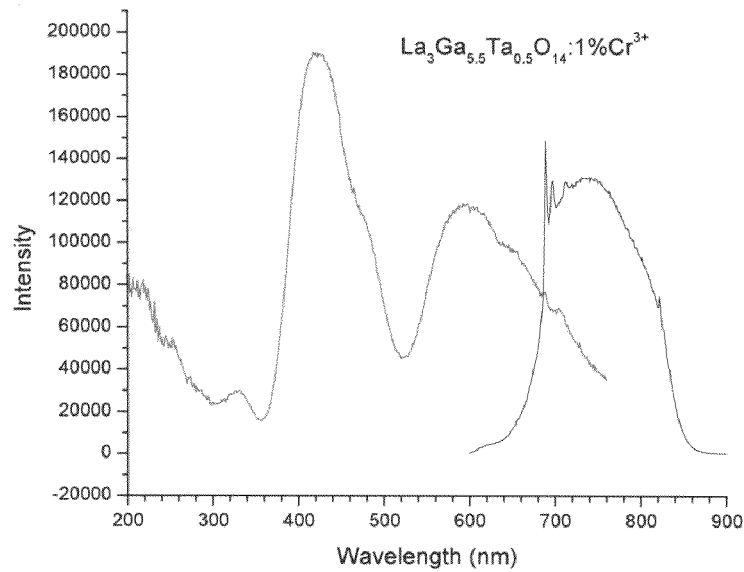
FIG. 3 (a) illustrates a graph showing the excitation and emission spectra (by FluoroMax2) of $La_3Ga_{5.5}Ta_{0.5}O_{14}$: $yCr^{3+}$, where y corresponds to ca. 1 mol % doping with $Cr^{3+}$ relative to the overall composition.
Figure 3B:
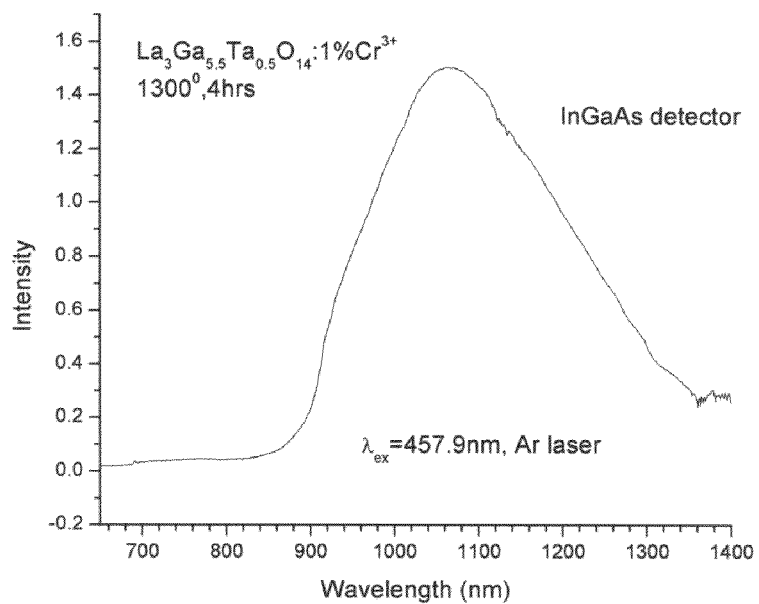
Figure 3C:
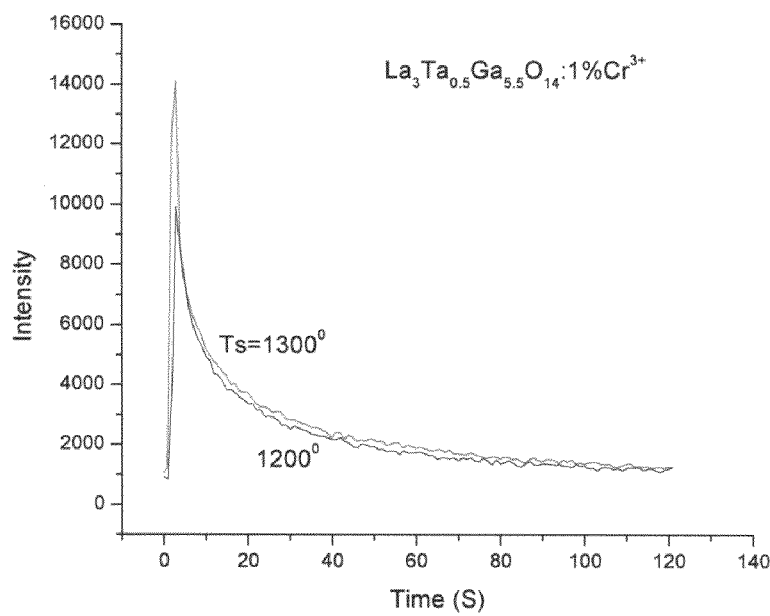

The synthesis conditions and procedures are similar as in Embodiment 1. The excitation and emission spectra are shown in FIGS. 3 (a) and (b).

Embodiment 4

$$La_3Ga_5SiO_{14}: 0.01Cr^{3+}$$

$$3La_2O_3+5Ga_2O_3+2SiO_2+0.01Cr_2O_3+0.05H_3BO_3$$

Figure 4A:
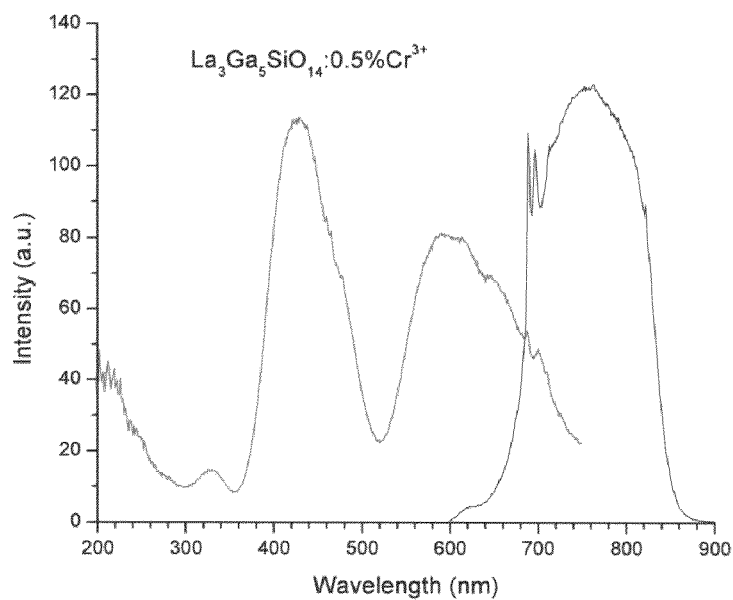
FIG. 4 (a) illustrates a graph showing the excitation and emission spectra (by FluoroMax2) of $La_3Ga_5SiO_{14}$: 1% $Cr^{3+}$.
Figure 4B:
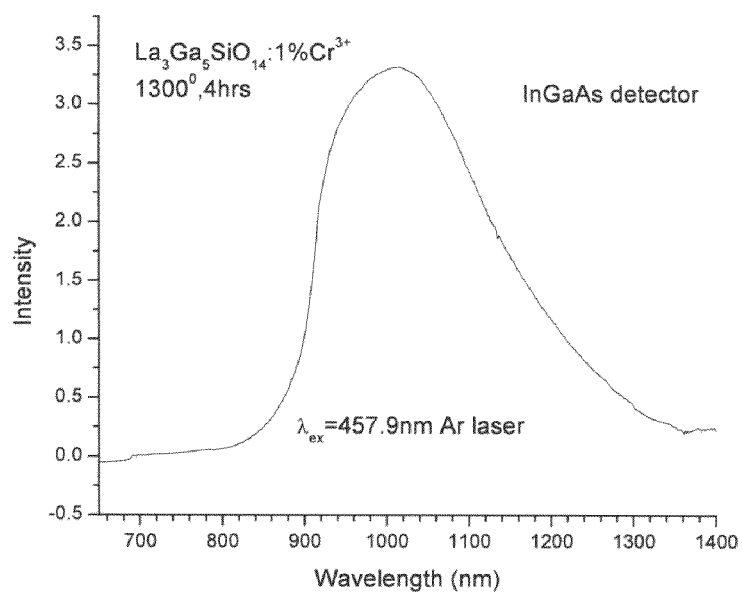

The synthesis conditions and procedures are similar as in Embodiment 1. The final sintering temperature should not be higher than 1250° C. to avoid melting. The excitation and emission spectra are shown in FIGS. 4 (*a*) and (*b*).

Embodiment 5

$$La_3Ga_5TiO_{14}: 0.01Cr^{3+}$$

$$3La_2O_3+5Ga_2O_3+2TiO_2+0.01Cr_2O_3+0.05H_3BO_3$$

Figure 5:
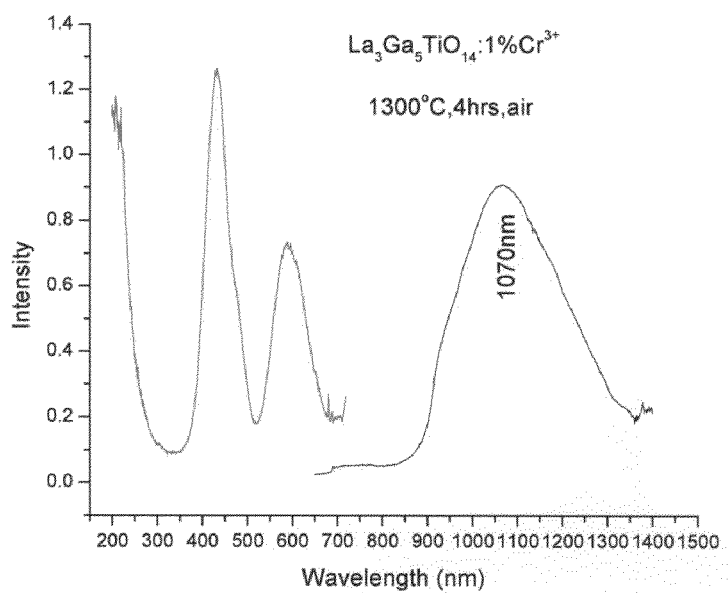
FIG. 5 illustrates a graph showing the excitation and emission spectra (by FluoroMax2) of $La_3Ga_5TiO_{14}$: $yCr^{3+}$, where y corresponds to ca. 1 mol % doping with $Cr^{3+}$ relative to the overall composition.

The samples are sintered at 1300° C. in air for four hours. The excitation and emission spectra are shown in FIGS. 5 (*a*) and (*b*). The emission band was measured by Triax 320. The peak is located at 1070 nm. The emission spectrum is not corrected by instrument spectral response as discussed in Embodiment 1.

Embodiment 6

$$La_3Ga_2Al_3GeO_{14}: 0.01Cr^{3+}$$

$$3La_2O_3+2Ga_2O_3+3Al_2O_3+2GeO_2+0.01Cr_2O_3+0.05H_3BO_3$$

Figure 6:
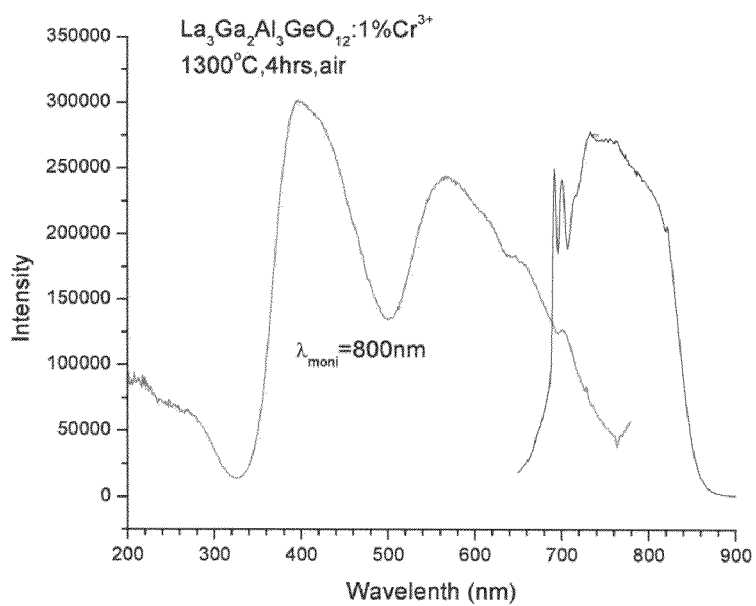
FIG. 6 (a) illustrates a graph showing the excitation and emission spectra (by FluoroMax2) of $La_3Ga_2Al_3GeO_{14}$: $yCr^{3+}$, where y corresponds to ca. 1 mol % doping with $Cr^{3+}$ relative to the overall composition.
Figure 6B:
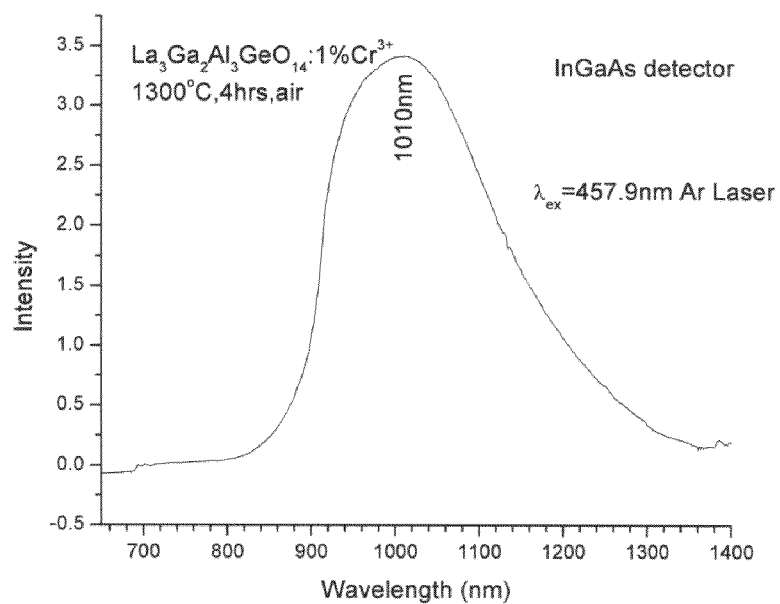

As mentioned above, Ga can be partially or fully replace d by $Al^{3+}$. The synthesis conditions and procedures are similar as in Embodiment 1. The excitation and emission spectra are shown in FIGS. 6 (*a*) and (*b*). It is noticed that the peak position is now shifted to the short wavelength side near 1010 nm.

Embodiment 7

$$La_3Ga_2In_2GeO_{14}: 0.01Cr^{3+}$$

$$3La_2O_3+3Ga_2O_3+2In_2O_3+2GeO_2+0.01Cr_2O_3+0.05H_3BO_3$$

Figure 7A:
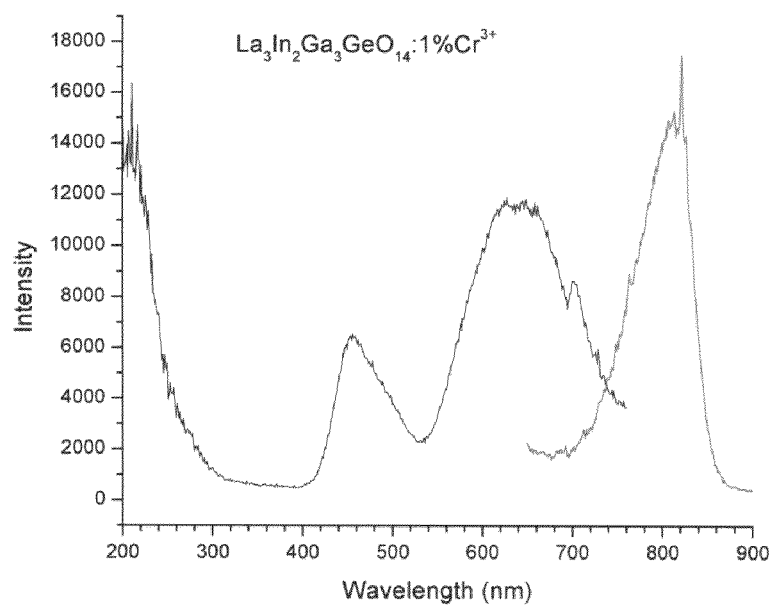
FIG. 7 (a) illustrates a graph showing the excitation and emission spectra (by FluoroMax2) of $La_3Ga_3In_2GeO_{14}$: $yCr^{3+}$, where y corresponds to ca. 1.5 mol % doping with $Cr^{3+}$ relative to the overall composition.
Figure 7B:
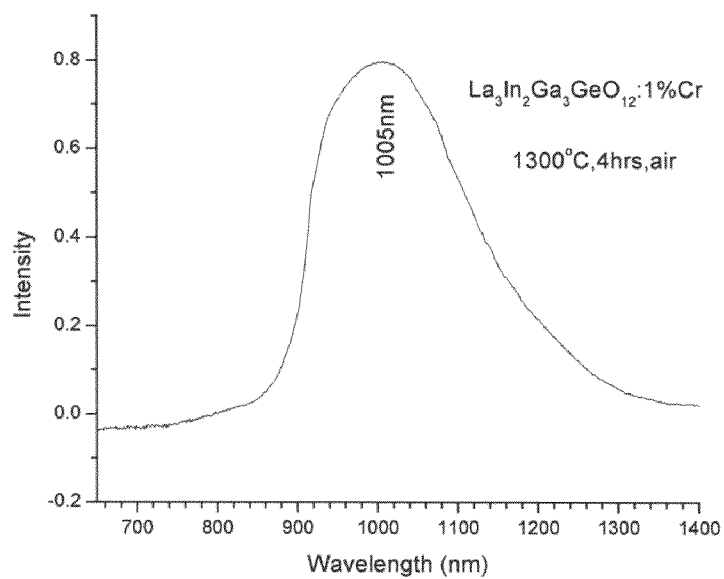

As mentioned above, Ga can be partially replaced by $In^{3+}$. The synthesis conditions and procedures are similar as in Embodiment 1. The excitation and emission spectra are shown in FIGS. 7 (*a*) and (*b*). It is noticed that the peak position is now shifted to the short wavelength side near 1004 nm.

Embodiment 8

$$La_2CaGa_5TaO_{14}: 1\% Cr^{3+}$$

$$2La_2O_3+2CaCO_3+5Ga_2O_3+2TaO_2+0.01Cr_2O_3+0.05H_3BO_3$$

Figure 8A:
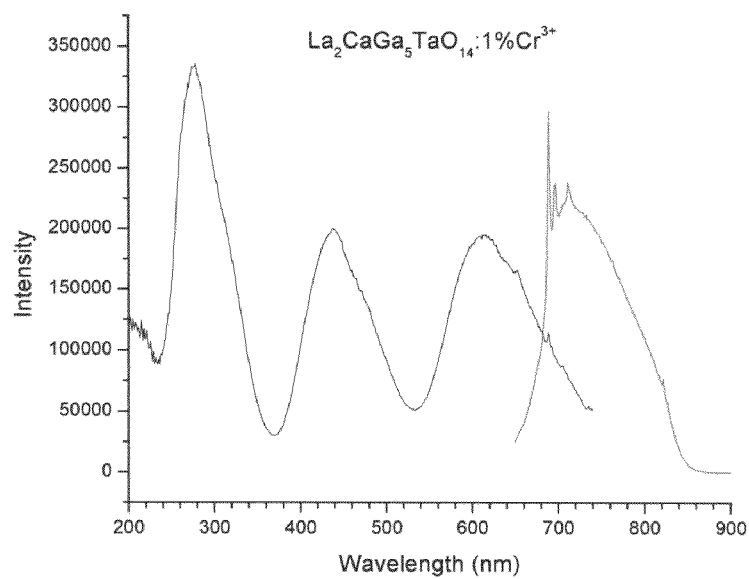
FIG. 8 (a) illustrates a graph showing the excitation and emission spectra (by FluoroMax2) of $La_2CaGa_5TaO_{14}$: $yCr^{3+}$, where y corresponds to ca. 1 mol % doping with $Cr^{3+}$ relative to the overall composition.
Figure 8B:
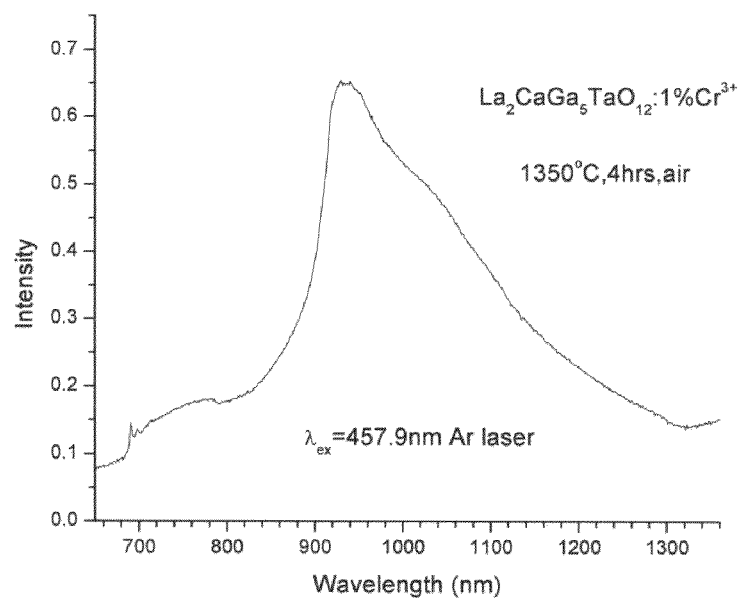

The synthesis conditions and procedures are similar to Embodiment 1. The excitation and emission spectra are shown in FIGS. 8 (*a*) and (*b*).

Embodiment 9

$$La_2SrGa_5TaO_{14}: 1\% Cr^{3+}$$

$$2La_2O_3+2SrCO_3+5Ga_2O_3+2TaO_2+0.01Cr_2O_3+0.05H_3BO_3$$

Figure 9A:
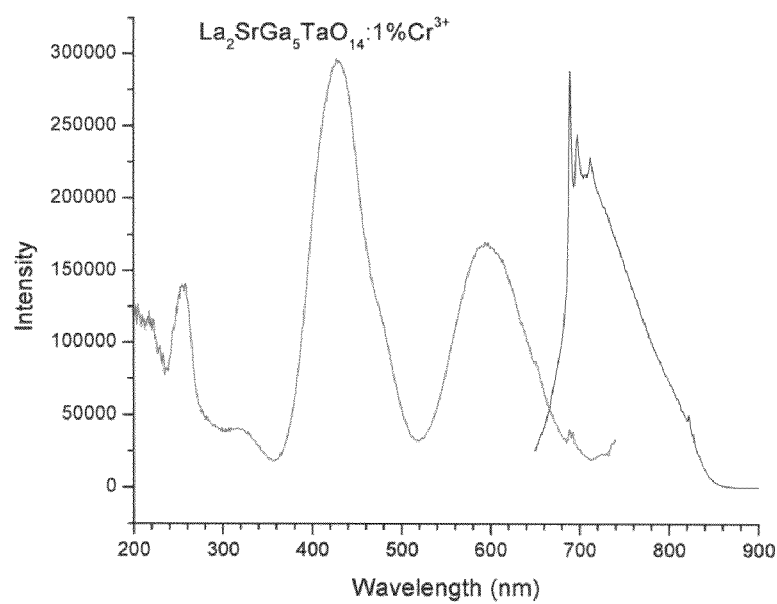
FIG. 9 (a) illustrates a graph showing the excitation and emission spectra (by FluoroMax2) of $La_2SrGa_5TaO_{14}$: $yCr^{3+}$, where y corresponds to ca. 1 mol doping with $Cr^{3+}$ relative to the overall composition.
Figure 9B:
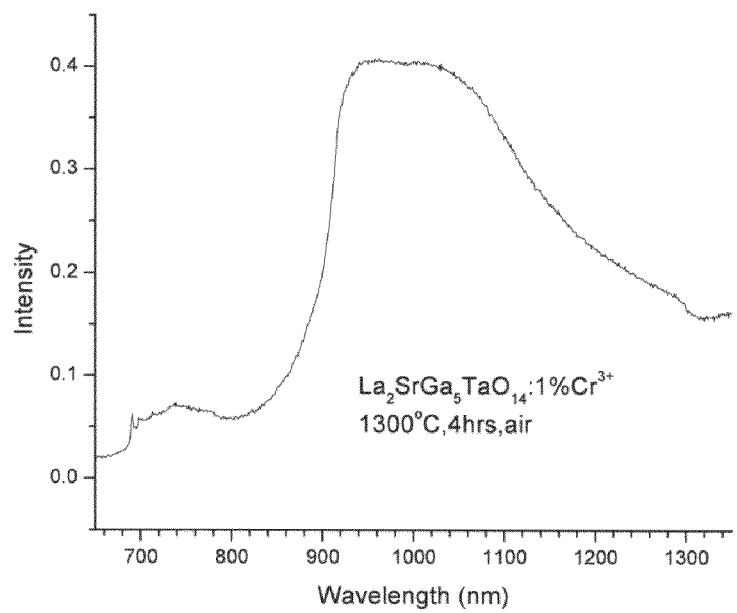

The synthesis conditions and procedures are similar to Embodiment 1. The excitation and emission spectra are shown in FIGS. 9 (*a*) and (*b*).

Embodiment 10

$$Lu_3Ga_5GeO_{14}: 1\% Cr^{3+}$$

$$3Lu_2O_3+5Ga_2O_3+2GeO_2+0.01Cr_2O_3+0.05H_3BO_3$$

Figure 10:
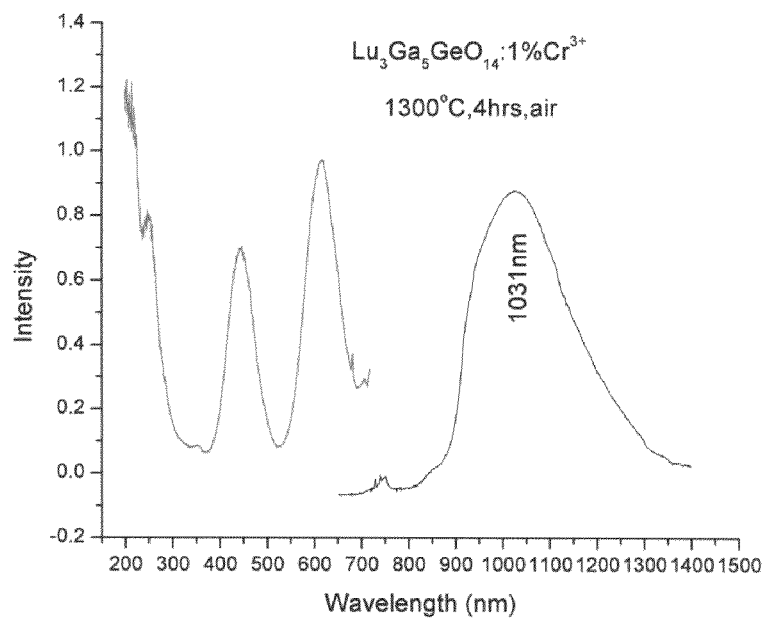
FIG. 10 illustrates a graph showing the excitation and emission spectra (by FluoroMax2) of $Lu_3Ga_5GeO_{14}$: $yCr^{3+}$, where y corresponds to ca. 1 mol % doping with $Cr^{3+}$ relative to the overall composition.

As mentioned above, La in the phosphors can be partially or fully replace by Lu. The synthesis conditions and procedures are similar to Embodiment 1. The excitation and emission spectra are shown in FIG. 10.

Embodiment 11

Figure 11:
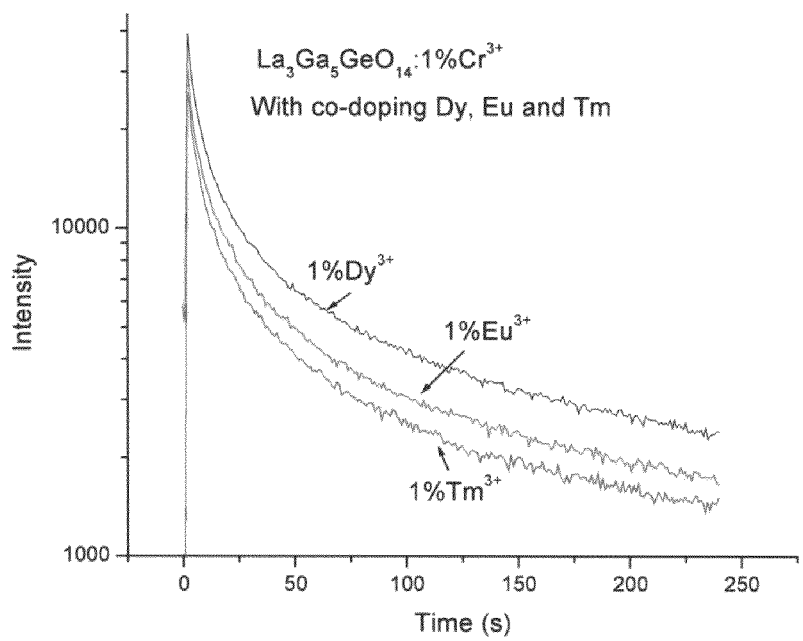
FIG. 11 illustrates a graph showing the decay curves of afterglow of $La_3Ga_5GeO_{14}$:$yCr^{3+}$ $zEu^{3+}$,$z'Dy^{3+}$ or $z''Tm^{3+}$, [co-doped with rare earth], where y, z, z' and z'' corresponds to ca. 1 mol % doping with each of $Cr^{3+}$, $Eu^{3+}$,$Dy^{3+}$ and $Tm^{3+}$, respectively, relative to the overall composition.

Traps Produced by Rare Earth Ions $La_3Ga_5GeO_{14}:1\% Cr^{3+}$ can be co-doped with rare earth such as $Dy^{3+}$, $Eu^{3+}$, $Tm^{3+}$, etc. The decay curves are shown in FIG. 11.

Embodiment 12

Figure 12:
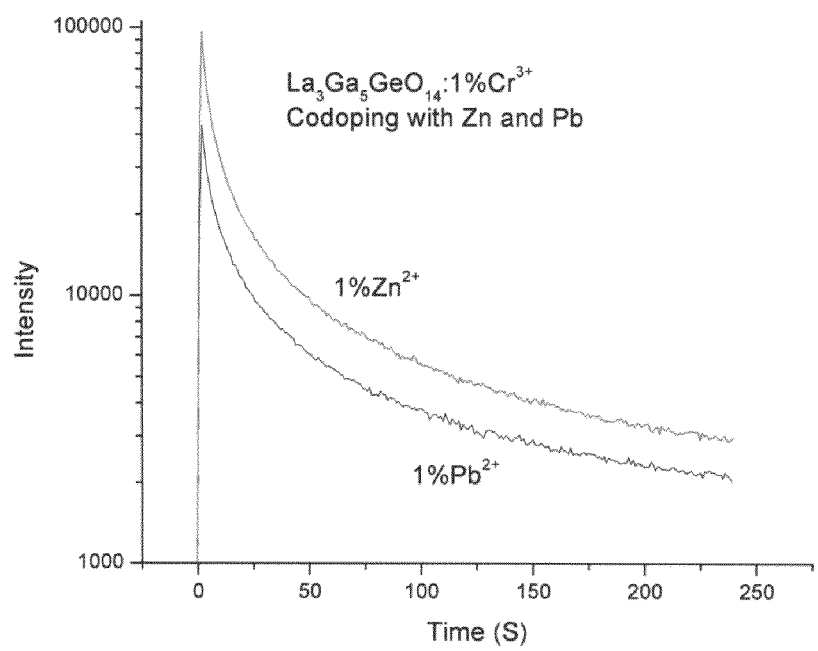
FIG. 12 illustrates a graph showing the decay curves of afterglow of $La_3Ga_5GeO_{14}$:$yCr^{3+}$, $zZn^2$,$z'Pb^{2+}$, [co-doped with divalent ions], where y, z, and z' corresponds to ca. 1 mol % doping with each of $Cr^{3+}$, $Zn^{2+}$,$Pb^{2+}$, respectively, relative to the overall composition.
Figure 13:
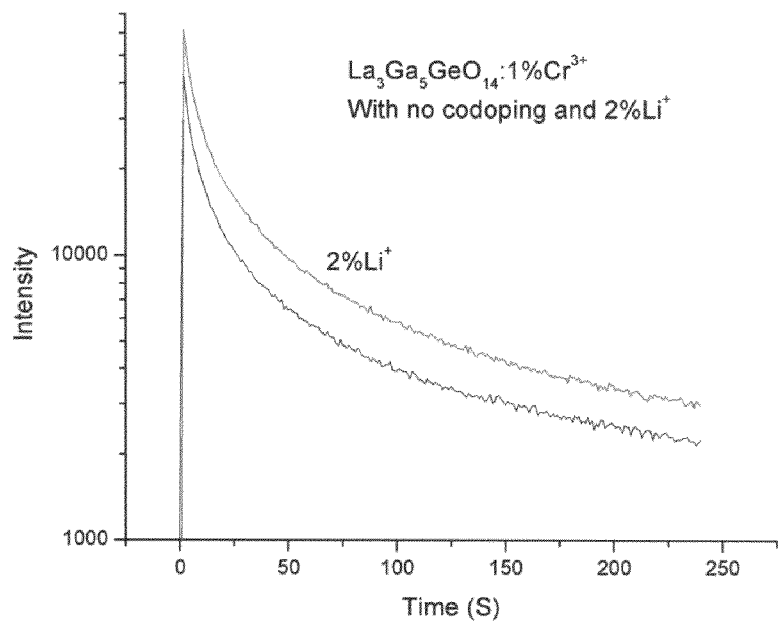
FIG. 13 illustrates a graph showing the decay curve of afterglow of $La_3Ga_5GeO_{14}$:$yCr^{3+}$,z $Li^+$,[co-doped with monovalent ion] at 1 mol % each of $Cr^{3+}$ and $Li^+$.

Traps Produced with Divalent Ions $La_3Ga_5GeO_{14}:1\% Cr^{3+}$ can be codoped with $Pb^{2+}$, $Mg^{2+}$, $Zn^{2+}$. The decay curves are shown in FIG. 12.

Embodiment 13

Traps Produced by Monovalent Ions $La_3Ga_5GeO_{14}:1\% Cr^{3+}$ can be codoped with monvalent ions such as $Li^+$ or $Na^+$. The decay curve is shown in FIG. 14.

Embodiment 14

Figure 14:
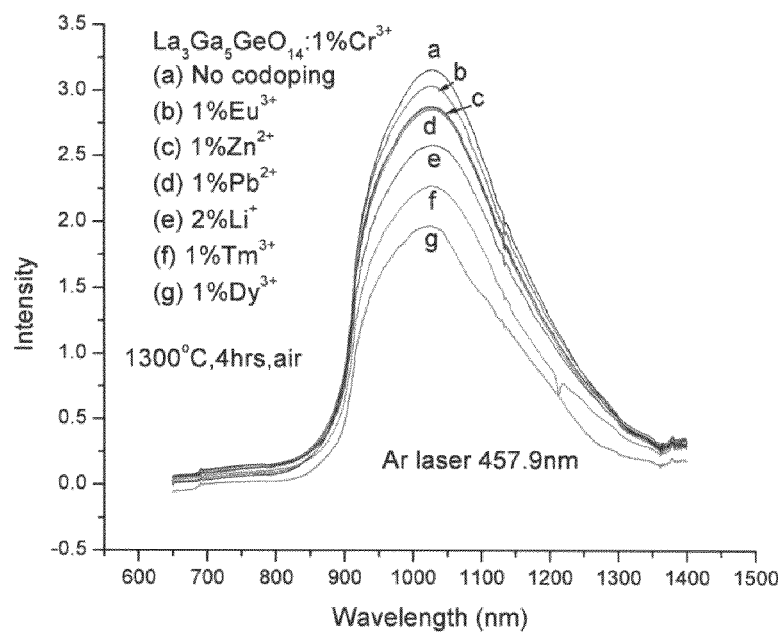
FIG. 14 illustrates a graph showing the instant emission spectra of $La_3Ga_5GeO_{14}$:$Cr^{3+}$ co-doped with several ions as specified.

As a general rule, when adding traps into phosphors, the afterglow and persistent time will be increased while the instant luminescence intensity may drop, as shown in FIG. 14. The best choice is the phosphors which have bright afterglow, longer persistent time but smaller intensity drop of the instant luminescence.

Exponential fitting of the decay curves indicate that persistency (i.e., afterglow) of rare earth-doped phosphors lasts in excess of about 24 hours.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In embodiments where "about" modifies 0 (zero), the term "about" can include ±1%, ±2%, ±3%, ±4%, ±5%, ±6%, ±7%, ±8%, ±9%, ±10%, or more of 0.00001 to 1. In addition, the phrase "about 'x' to 'y'" includes "about 'x' to about 'y'".

It should be emphasized that the above-described embodiments of the present disclosure are merely possible examples of implementations, and are merely set forth for a clear understanding of the principles of the disclosure. Many variations and modifications may be made to the above-described embodiments. All such modifications and variations are intended to be included herein within the scope of this disclosure and protected by the following claims.

What is claimed is:

1. A composition comprising:
a phosphor that emits radiation when excited by incident radiation with a wavelength about 100 nm and 750 nm, wherein the phosphor has the following chemical formula: $M_3Ga_{5-x}A_xDO_{(m+(3y/2)+(tz/2))}:(yCr^{3+},zT^{t+})$, wherein M is an ion selected from $Gd^{3+}$, $Lu^{3+}$, $Y^{3+}$, $Bi^{3+}$, $Ca^{2+}$, $Sr^{2+}$, $Sc^{3+}$, or combinations thereof; wherein A is an ion selected from: $Al^{3+}$, $Sc^{3+}$, $In^{3+}$, or combinations thereof, wherein $0 \leq x < 5$; wherein D is selected from $Si^{4+}$, $Ge^{4+}$, $Ti^{4+}$, $Zr^{4+}$, $Hf^{4+}$, $Ga_{0.5}Nb_{0.5}$, $Ga_{0.5}Ta_{0.5}$, $Cr^{4+}$, $Cr^{6+}$ or combinations thereof; wherein Nb and Ta have an oxidation state selected from: +3, +4, or +5; wherein D is selected from Nb or Ta, if one of the M of $M_3$ is $Ca^{2+}$, $Sr^{2+}$, or combinations thereof; wherein y is about 0.00001 to 0.075; wherein z is about 0 to 0.075; wherein T is selected from: (a) $Ce^{3+}$, $Pr^{3+}$, $Pm^{3+}$, $Nd^{3+}$, $Sm^{3+}$, $Eu^{3+}$, $Tb^{3+}$, $Dy^{3+}$, $Ho^{3+}$, $Er^{3+}$, $Tm^{3+}$, $Yb^{3+}$, $Lu^{3+}$, $Th^{4+}$ or combinations thereof; (b) $Mg^{2+}$, $Zn^{2+}$, $Pb^{2+}$, or combinations thereof; or (c) $Li^+$, $Na^+$, or combinations thereof; t is the charge of the cation T, which is a charge selected from: +1, +2, +3, or +4; and m is a number that, when multiplied by (−2) counter-balances the positive charge imparted by the $[M_3Ga_{5-x}A_xD]$ moiety.

2. The composition of claim 1, wherein the radiation wavelength has an emission band peak at about 750 to 1450 nm.

3. The composition of claim 1, wherein the radiation wavelength has an emission band peak at about 945 to 1070 nm.

4. The composition of claim 1, wherein Ga is partially substituted by a cation selected from: $Al^{3+}$, $Sc^{3+}$, $In^{3+}$, or combinations thereof.

5. The composition of claim 1, wherein y is about 0.001 to 0.02.

6. The composition of claim 5, wherein T is selected from: $Dy^{3+}$, $Eu^{3+}$, $Nd^{3+}$, $Tm^{3+}$, or combinations thereof.

7. The composition of claim 5, wherein in z=0.0001, and wherein T is selected from: $Pb^{2+}$, $Mg^{2+}$, or $Zn^{2+}$.

8. The composition of claim 5, wherein in z=0.0001, and wherein T is selected from $Li^+$, $Na^+$, or combinations thereof.

9. The composition of claim 5, wherein in z=0.0001, and wherein T is a combination of a first cation and a second cation, wherein the first cation is selected from $Nd^{3+}$, $Eu^{3+}$, or $Dy^{3+}$, and the second cation is selected from $Pb^{2+}$, $Zn^{2+}$, $Li^+$, or $Na^+$.

10. The composition of claim 1, wherein T is selected from: $Dy^{3+}$, $Eu^{3+}$, $Nd^{3+}$, $Tm^{3+}$, or combinations thereof.

11. The composition of claim 1, wherein in z=0.0001, wherein T is selected from: $Pb^{2+}$, $Mg^{2+}$, or $Zn^{2+}$.

12. The composition of claim 1, wherein in z=0.0001, wherein T is selected from $Li^+$, $Na^+$, or combinations thereof.

13. The composition of claim 1, wherein in z=0.0001, wherein T is a combination of a first cation and a second cation, wherein the first cation is selected from $Nd^{3+}$, $Eu^{3+}$, or $Dy^{3+}$, and the second cation is selected from $Pb^{2+}$, $Zn^{2+}$, $Li^+$, or $Na^+$.

14. A composition comprising:
a phosphor that emits radiation, when excited by incident radiation with wavelength about 100 nm and 750 nm, wherein the phosphor has the following chemical formula: $M_3Ga_{5-x}A_xDO_{(m+(3y/2)+(3z'/2)+z''+z'''/2)}:(yCr^{3+}, z'T1^{3+}, z''T2^{2+}, z'''T3^+)$; wherein M is an ion selected from: $Gd^{3+}$, $Lu^{3+}$, $Y^{3+}$, $Bi^{3+}$, $Ca^{2+}$, $Sr^{2+}$, $Sc^{3+}$ or combinations thereof; wherein A is an ion selected from: $Al^{3+}$, $Sc^{3+}$, $In^{3+}$ or combinations thereof, wherein $0 \leq x < 5$; wherein D is selected from $Si^{4+}$, $Ge^{4+}$, $Ti^{4+}$, $Zr^{4+}$, $Hf^{4+}$, $Ga_{0.5}Nb_{0.5}$, $Ga_{0.5}Ta_{0.5}$, $Cr^{4+}$, $Cr^{6+}$ or combinations thereof; wherein Nb and Ta have an oxidation state selected from: +3, +4, or +5; wherein D is selected from Nb or Ta, if one of the M of $M_3$ is $Ca^{2+}$, $Sr^{2+}$, or combinations thereof; wherein y is about 0.00001 to 0.075; wherein each of z', z'', and z''' are independently about 0 to 0.075; wherein each of T1, T2, and T3 are independently selected from: (a) $Ce^{3+}$, $Pr^{3+}$, $Pm^{3+}$, $Nd^{3+}$, $Sm^{3+}$, $Eu^{3+}$, $Tb^{3+}$, $Dy^{3+}$, $Ho^{3+}$, $Er^{3+}$, $Tm^{3+}$, $Yb^{3+}$, $Lu^{3+}$, $Th^{4+}$ or combinations thereof; (b) $Mg^{2+}$, $Zn^{2+}$, $Pb^{2+}$, or combinations thereof; or (c) $Li^+$, $Na^+$, or combinations thereof; and wherein m is a number that, when multiplied by (−2) counter-balances the positive charge imparted by the $[M_3Ga_{5-x}A_xD]$ moiety.

15. The composition of claim 14, wherein z''=z'''=0, and wherein, z'>0, and T is a trivalent cation.

16. The composition of claim 14, wherein z'=z''=0, and wherein z'''>0, and T is a monovalent cation.

17. The composition of claim 14, wherein z'=z'''=0, and wherein z''>0, and T is a divalent cation.

18. The composition of claim 14, wherein one of z', z'' and z''' is 0.

19. A composition comprising:
a phosphor that emits radiation when excited by incident radiation with a wavelength about 100 nm and 750 nm, wherein the phosphor has the following chemical formula: $M_3Ga_{5-x}A_xDO_{(m+(3y/2)+(tz/2))}:(yCr^{3+},zT^{t+})$, wherein $M_3$ is one of the following: $La_2Ca$, wherein x is about 0, and wherein D is Nb; $La_2Sr$, wherein x is about 0, and wherein D is Nb $La_2Ca$, wherein x is about 0, and wherein D is Ta; and $La_2Sr$, wherein x is about 0, and wherein D is Ta; wherein A is an ion selected from: $Al^{3+}$, $Sc^{3+}$, $In^{3+}$, or combinations thereof, wherein Nb and Ta have an oxidation state selected from: +3, +4, or +5; wherein D is selected from Nb or Ta, if one of the M of $M_3$ is $Ca^{2+}$, $Sr^{2+}$, or combinations thereof; wherein y is about 0.00001 to 0.075; wherein z is about 0.0001 to 0.075; wherein T is selected from: (a) $Ce^{3+}$, $Pr^{3+}$, $Pm^{3+}$, $Nd^{3+}$, $Sm^{3+}$, $Eu^{3+}$, $Tb^{3+}$, $Dy^{3+}$, $Ho^{3+}$, $Er^{3+}$, $Tm^{3+}$, $Yb^{3+}$, $Lu^{3+}$, $Th^{4+}$ or combinations thereof; (b) $Mg^{2+}$, $Zn^{2+}$, $Pb^{2+}$, or combinations thereof; or (c) $Li^+$, $Na^+$, or combinations thereof; t is the charge of the cation T, which is a charge selected from: +1, +2, +3, or +4; and m is a number that, when multiplied by (−2) counter-balances the positive charge imparted by the $[M_3Ga_{5-x}A_xD]$ moiety.

20. The composition of claim 19, wherein the radiation wavelength has an emission band peak at about 750 to 1450 nm.

21. The composition of claim 19, wherein the radiation wavelength has an emission band peak at about 945 to 1070 nm.

22. The composition of claim 19, wherein La is partially or fully substituted by a cation selected from: $Y^{3+}$, $Gd^{3+}$, $Lu^{3+}$, $Bi^{3+}$, or combinations thereof.

23. The composition of claim 19, wherein Ga is partially substituted by a cation selected from: $Al^{3+}$, $Sc^{3+}$, $In^{3+}$, or combinations thereof.

24. The composition of claim 19, wherein y is about 0.001 to 0.02.

25. The composition of claim 24, wherein T is selected from: $Dy^{3+}$, $Eu^{3+}$, $Nd^{3+}$, $Tm^{3+}$, or combinations thereof.

26. The composition of claim 24, wherein T is selected from: $Pb^{2+}$, $Mg^{2+}$, or $Zn^{2+}$.

27. The composition of claim 24, wherein T is selected from $Li^+$, $Na^+$, or combinations thereof.

28. The composition of claim 24, wherein T is a combination of a first cation and a second cation, wherein the first cation is selected from $Nd^{3+}$, $Eu^{3+}$, or $Dy^{3+}$, and the second cation is selected from $Pb^{2+}$, $Zn^{2+}$, $Li^+$, or $Na^+$.

29. The composition of claim 19, wherein T is selected from: $Dy^{3+}$, $Eu^{3+}$, $Nd^{3+}$, $Tm^{3+}$, or combinations thereof.

30. The composition of claim 19, wherein T is selected from: $Pb^{2+}$, $Mg^{2+}$, or $Zn^{2+}$.

31. The composition of claim 19, wherein T is selected from $Li^+$, $Na^+$, or combinations thereof.

32. The composition of claim 19, wherein T is a combination of a first cation and a second cation, wherein the first cation is selected from $Nd^{3+}$, $Eu^{3+}$, or $Dy^{3+}$, and the second cation is selected from $Pb^{2+}$, $Zn^{2+}$, $Li^+$, or $Na^+$.

33. A composition comprising:
a phosphor that emits radiation when excited by incident radiation with a wavelength about 100 nm and 750 nm, wherein the phosphor has the following chemical formula: $M_3Ga_{5-x}A_xDO_{(m+(3y/2)+(tz/2))}:(yCR^{3+},zT^{t+})$, wherein $M_3$ is selected $La_2Ca$ and $La_2Sr$; wherein A is an ion selected from: $Al^{3+}$, $Sc^{3+}$, $In^{3+}$, or combinations thereof, wherein x is about 0; wherein D is selected from Nb and Ta; wherein Nb and Ta have an oxidation state selected from: +3, +4, or +5; wherein D is selected from Nb or Ta, if one of the M of $M_3$ is $Ca^{2+}$, $Sr^{2+}$, or combinations thereof; wherein y is about 0.00001 to 0.075; wherein z is about 0 to 0.075; wherein T is selected from: (a) $Ce^{3+}$, $Pr^{3+}$, $Pm^{3+}$, $Nd^{3+}$, $Sm^{3+}$, $Eu^{3+}$, $Tb^{3+}$, $Dy^{3+}$, $Ho^{3+}$, $Er^{3+}$, $Tm^{3+}$, $Yb^{3+}$, $Lu^{3+}$, $Th^{4+}$ or combinations thereof; (b) $Mg^{2+}$, $Zn^{2+}$, $Pb^{2+}$, or combinations thereof; or (c) $Li^+$, $Na^+$, or combinations thereof; t is the charge of the cation T, which is a charge selected from: +1, +2, +3, or +4; and m is a number that, when multiplied by (−2) counter-balances the positive charge imparted by the $[M_3Ga_{5-x}A_xD]$ moiety.

34. A composition comprising:
a phosphor that emits radiation when excited by incident radiation with a wavelength about 100 nm and 750 nm, wherein the phosphor has the following chemical formula: $M_3Ga_{5-x}A_xDO_{(m+(3y/2)+(tz/2))}:(yCr^{3+},zT^{t+})$, wherein M is an ion selected from: $La^{3+}$, $Gd^{3+}$, $Lu^{3+}$, $Y^{3+}$, $Bi^{3+}$, $Ca^{2+}$, $Sr^{2+}$, $Sc^{3+}$, or combinations thereof; wherein A is an ion selected from: $Al^{3+}$, $Sc^{3+}$, $In^{3+}$, or combinations thereof, wherein $0 \leq x < 5$; wherein D is selected from $Si^{4+}$, $Ge^{4+}$, $Ti^{4+}$, $Zr^{4+}$, $Hf^{4+}$, $Ga_{0.5}Nb_{0.5}$, $Ga_{0.5}Ta_{0.5}$, $Cr^{4+}$, $Cr^{6+}$ or combinations thereof; wherein Nb and Ta have an oxidation state selected from: +3, +4, or +5; wherein D is selected from Nb or Ta, if one of the M of $M_3$ is $Ca^{2+}$, $Sr^{2+}$, or combinations thereof; wherein y is about 0.00001 to 0.075; wherein z is about 0.0001 to 0.075; wherein T is selected from: (a) $Ce^{3+}$, $Pr^{3+}$, $Pm^{3+}$, $Nd^{3+}$, $Sm^{3+}$, $Eu^{3+}$, $Tb^{3+}$, $Dy^{3+}$, $Ho^{3+}$, $Er^{3+}$, $Tm^{3+}$, $Yb^{3+}$, $Lu^{3+}$, $Th^{4+}$ or combinations thereof; (b) $Mg^{2+}$, $Zn^{2+}$, $Pb^{2+}$, or combinations thereof; or (c) $Li^+$, $Na^+$, or combinations thereof; t is the charge of the cation T, which is a charge selected from: +1, +2, +3, or +4; and m is a number that, when multiplied by (−2) counter-balances the positive charge imparted by the $[M_3Ga_{5-x}A_xD]$ moiety, wherein Ga is partially substituted by a cation selected from: $Al^{3+}$, $Sc^{3+}$, $In^{3+}$, or combinations thereof.

35. The composition of claim 34, wherein $M_3$ is $La_3$, wherein x is 0, and wherein D is Ge.

36. The composition of claim 34, wherein $M_3$ is $La_3$, wherein x is 0, and wherein D is $Ga_{0.5}Nb_{0.5}$.

37. The composition of claim 34, wherein $M_3$ is $La_3$, wherein x is 0, and wherein D is $Ga_{0.5}Ta_{0.5}$.

38. The composition of claim 34, wherein $M_3$ is $La_2Ca$, wherein x is 0, and wherein D is Nb.

39. The composition of claim 34, wherein $M_3$ is $La_2Sr$, wherein x is 0, and wherein D is Nb.

40. The composition of claim 34, wherein $M_3$ is $La_2Ca$, wherein x is 0, and wherein D is Ta.

41. The composition of claim 34, wherein $M_3$ is $La_2Sr$, wherein x is 0, and wherein D is Ta.

42. The composition of claim 34, wherein La is partially or fully substituted by a cation selected from: $Y^{3+}$, $Gd^{3+}$, $Lu^{3+}$, $Bi^{3+}$, or combinations thereof.

43. The composition of claim 34, wherein y is about 0.001 to 0.02.

44. The composition of claim 43, wherein T is selected from: $Dy^{3+}$, $Eu^{3+}$, $Nd^{3+}$, $Tm^{3+}$, or combinations thereof.

45. The composition of claim 43, wherein T is selected from: $Pb^{2+}$, $Mg^{2+}$, or $Zn^{2+}$.

46. The composition of claim 43, wherein T is selected from $Li^+$, $Na^+$, or combinations thereof.

47. The composition of claim 43, wherein T is a combination of a first cation and a second cation, wherein the first cation is selected from $Nd^{3+}$, $Eu^{3+}$, or $Dy^{3+}$, and the second cation is selected from $Pb^{2+}$, $Zn^{2+}$, $Li^+$, or $Na^+$.

48. The composition of claim 34, wherein T is selected from: $Dy^{3+}$, $Eu^{3+}$, $Nd^{3+}$, $Tm^{3+}$, or combinations thereof.

49. The composition of claim 34, wherein T is selected from: $Pb^{2+}$, $Mg^{2+}$, or $Zn^{2+}$.

50. The composition of claim 34, wherein T is selected from $Li^+$, $Na^+$, or combinations thereof.

51. The composition of claim 34, wherein T is a combination of a first cation and a second cation, wherein the first cation is selected from $Nd^{3+}$, $Eu^{3+}$, or $Dy^{3+}$, and the second cation is selected from $Pb^{2+}$, $Zn^{2+}$, $Li^+$, or $Na^+$.

52. A composition comprising:
a phosphor that emits radiation when excited by incident radiation with a wavelength about 100 nm and 750 nm, wherein the phosphor has the following chemical formula: $M_3Ga_{5-x}A_xDO_{(m+(3y/2)+(tz/2))}:(yCr^{3+},zT^{t+})$, wherein M is an ion selected from: $La^{3+}$, $Gd^{3+}$, $Lu^{3+}$, $Y^{3+}$, $Bi^{3+}$, $Ca^{2+}$, $Sr^{2+}$, $Sc^{3+}$, or combinations thereof; wherein A is an ion selected from: $Al^{3+}$, $Sc^{3+}$, $In^{3+}$, or combinations thereof, wherein $0 \leq x < 5$; wherein D is selected from $Si^{4+}$, $Ge^{4+}$, $Ti^{4+}$, $Zr^{4+}$, $Hf^{4+}$, $Ga_{0.5}Nb_{0.5}$, $Ga_{0.5}Ta_{0.5}$, $Cr^{4+}$, $Cr^{6+}$ or combinations thereof; wherein Nb and Ta have an oxidation state selected from: +3, +4, or +5; wherein D is selected from Nb or Ta, if one of the M of $M_3$ is $Ca^{2+}$, $Sr^{2+}$, or combinations thereof; wherein y is about 0.00001 to 0.075; wherein z is about 0.0001 to 0.075; wherein T is selected from: $Mg^{2+}$, $Zn^{2+}$, $Pb^{2+}$, or combinations thereof; t is the charge of the cation T, which is a charge selected from: +1, +2, +3, or +4; and m is a number that, when multiplied by (−2) counter-balances the positive charge imparted by the $[M_3Ga_{5-x}A_xD]$ moiety.

53. The composition of claim 52, wherein $M_3$ is $La_3$, wherein x is about 0, and wherein D is Ge.

54. The composition of claim 52, wherein $M_3$ is $La_3$, wherein x is about 0, and wherein D is $Ga_{0.5}Nb_{0.5}$.

55. The composition of claim 52, wherein $M_3$ is $La_3$, wherein x is about 0, and wherein D is $Ga_{0.5}Ta_{0.5}$.

56. The composition of claim 52, wherein $M_3$ is $La_2Ca$, wherein x is about 0, and wherein D is Nb.

57. The composition of claim 52, wherein $M_3$ is $La_2Sr$, wherein x is about 0, and wherein D is Nb.

58. The composition of claim 52, wherein $M_3$ is $La_2Ca$, wherein x is about 0, and wherein D is Ta.

59. The composition of claim 52, wherein $M_3$ is $La_2Sr$, wherein x is about 0, and wherein D is Ta.

60. The composition of claim 52, wherein La is partially or fully substituted by a cation selected from: $Y^{3+}$, $Gd^{3+}$, $Lu^{3+}$, $Bi^{3+}$, or combinations thereof.

61. A composition comprising:
a phosphor that emits radiation when excited by incident radiation with a wavelength about 100 nm and 750 nm, wherein the phosphor has the following chemical formula: $M_3Ga_{5-x}A_xDO_{(m+(3y/2)+(tz/2))}$:($yCr^{3+}$,$zT^{t+}$), wherein M is an ion selected from: $La^{3+}$, $Gd^{3+}$, $Lu^{3+}$, $Y^{3+}$, $Bi^{3+}$, $Ca^{2+}$, $Sr^{2+}$, $Sc^{3+}$, or combinations thereof; wherein A is an ion selected from: $Al^{3+}$, $Sc^{3+}$, $In^{3+}$, or combinations thereof, wherein $0 \leq x < 5$; wherein D is selected from $Si^{4+}$, $Ge^{4+}$, $Ti^{4+}$, $Zr^{4+}$, $Hf^{4+}$, $Ga_{0.5}Nb_{0.5}$, $Ga_{o5}Ta_{0.5}$, $Cr^{4+}$, $Cr^{6+}$ or combinations thereof; wherein Nb and Ta have an oxidation state selected from: +3, +4, or +5; wherein D is selected from Nb or Ta, if one of the M of $M_3$ is $Ca^{2+}$, $Sr^{2+}$, or combinations thereof; wherein y is about 0.00001 to 0.075; wherein z is about 0.0001 to 0.075; wherein T is selected from: $Li^+$, $Na^+$, or combinations thereof; t is the charge of the cation T, which is a charge selected from: +1, +2, +3, or +4; and m is a number that, when multiplied by (−2) counter-balances the positive charge imparted by the $[M_3Ga_{5-x}A_xD]$ moiety.

62. The composition of claim 61, wherein $M_3$ is $La_3$, wherein x is about 0, and wherein D is Ge.

63. The composition of claim 61, wherein $M_3$ is $La_3$, wherein x is about 0, and wherein D is $Ga_{0.5}Nb_{0.5}$.

64. The composition of claim 61, wherein $M_3$ is $La_3$, wherein x is about 0, and wherein D is $Ga_{0.5}Ta_{0.5}$.

65. The composition of claim 61, wherein $M_3$ is $La_2Ca$, wherein x is about 0, and wherein D is Nb.

66. The composition of claim 61, wherein $M_3$ is $La_2Sr$, wherein x is about 0, and wherein D is Nb.

67. The composition of claim 61, wherein $M_3$ is $La_2Ca$, wherein x is about 0, and wherein D is Ta.

68. The composition of claim 61, wherein $M_3$ is $La_2Sr$, wherein x is about 0, and wherein D is Ta.

69. The composition of claim 61, wherein La is partially or fully substituted by a cation selected from: $Y^{3+}$, $Gd^{3+}$, $Lu^{3+}$, $Bi^{3+}$, or combinations thereof.

70. A composition comprising:
a phosphor that emits radiation when excited by incident radiation with a wavelength about 100 nm and 750 nm, wherein the phosphor has the following chemical formula: $M_3Ga_{5-x}A_xDO_{(m+(3y/2)+(tz/2))}$:($yCr^{3+}$,$zT^{t+}$), wherein M is an ion selected from: $La^{3+}$, $Gd^{3+}$, $Lu^{3+}$, $Y^{3+}$, $Bi^{3+}$, $Ca^{2+}$, $Sr^{2+}$, $Sc^{3+}$, or combinations thereof; wherein A is an ion selected from: $Al^{3+}$, $Sc^{3+}$, $In^{3+}$, or combinations thereof, wherein $0 \leq x < 5$; wherein D is selected from $Si^{4+}$, $Ge^{4+}$, $Ti^{4+}$, $Zr^{4+}$, $Hf^{4+}$, $Ga_{0.5}Nb_{0.5}$, $Ga_{0.5}Ta_{0.5}$, $Cr^{4+}$, $Cr^{6+}$ or combinations thereof; wherein Nb and Ta have an oxidation state selected from: +3, +4, or +5; wherein D is selected from Nb or Ta, if one of the M of $M_3$ is $Ca^{2+}$, $Sr^{2+}$, or combinations thereof; wherein y is about 0.00001 to 0.075; wherein z is about 0.0001 to 0.075; wherein T is a combination of a first cation and a second cation, wherein the first cation is selected from $Nd^{3+}$, $Eu^{3+}$, or $Dy^{3+}$, and the second cation is selected from $Pb^{2+}$, $Zn^{2+}$, $Li^+$, or $Na^+$; t is the charge of the cation T, which is a charge selected from: +1, +2, +3, or +4; and m is a number that, when multiplied by (−2) counter-balances the positive charge imparted by the $[M_3Ga_{5-x}A_xD]$ moiety.

71. The composition of claim 70, wherein $M_3$ is $La_3$, wherein x is about 0, and wherein D is Ge.

72. The composition of claim 70, wherein $M_3$ is $La_3$, wherein x is about 0, and wherein D is $Ga_{0.5}$ $Nb_{0.5}$.

73. The composition of claim 70, wherein $M_3$ is $La_3$, wherein x is about 0, and wherein D is $Ga_{0.5}Ta_{0.5}$.

74. The composition of claim 70, wherein $M_3$ is $La_2Ca$, wherein x is about 0, and wherein D is Nb.

75. The composition of claim 70, wherein $M_3$ is $La_2Sr$, wherein x is about 0, and wherein D is Nb.

76. The composition of claim 70, wherein $M_3$ is $La_2Ca$, wherein x is about 0, and wherein D is Ta.

77. The composition of claim 70, wherein $M_3$ is $La_2Sr$, wherein x is about 0, and wherein D is Ta.

78. The composition of claim 70, wherein La is partially or fully substituted by a cation selected from: $Y^{3+}$, $Gd^{3+}$, $Lu^{3+}$, $Bi^{3+}$, or combinations thereof.

79. A method of making the composition of one of claims 1, 19, 33, 34, 61 and 72, comprising causing the oxides of the individual metals in that composition to react with each other in a mixture.

80. The method of claim 79, comprising sintering the mixture of oxides.

81. The method of claim 80, wherein a flux material is added to the mixture prior to sintering.

82. The method of claim 81 wherein the flux material is selected from $B_2O_3$, $H_3BO_3$, $Li_2CO_3$, $Na_2CO_3$, $Bi_2O_3$, PbO, or combinations thereof.

83. The method of claim 79, wherein the mixture of oxides is combusted directly by a flame.

84. A method of making the composition of one of claims 1, 19, 33, 34, 61, and 72, comprising co-precipitating the individual oxides as a mixture from solution and sintering the precipitate.

85. A material comprising:
the composition of one of claims 1, 19, 33, 34, 61, and 72, wherein the composition is in one of the following forms: powders, nanopowders, ceramics, single crystals, and combinations thereof.

86. The composition of claim 85, wherein the emission persists from about 1 second to 26 hours after excitation.

87. An article comprising the composition of one of claims 1, 19, 33, 34, 67, and 72.

88. The article of claim 87, wherein the article is selected from a crayon, paint, an ink, a wax, a polymer composition, a polymer-based vesicle, and combinations thereof.

89. The article of claim 87, wherein the emission persists from about 1 second to about 26 hours after excitation.

90. A method of making the composition of one of claims 1, 19, and 33, comprising sintering the mixture of oxides and causing the oxides of the individual metals in that composition to react with each other in a mixture.

91. The method of claim 90, wherein a flux material is added to the mixture prior to sintering.

92. The method of claim 91, wherein the flux material is selected from $B_2O_3$, $H_3BO_3$, $Li_2CO_3$, $Na_2CO_3$, $Bi_2O_3$, PbO, or combinations thereof.

* * * * *